US011980845B2

(12) United States Patent
Lee et al.

(10) Patent No.: US 11,980,845 B2
(45) Date of Patent: May 14, 2024

(54) FLUE GAS CLEANING SOLUTION PURIFICATION SYSTEM AND METHOD THEREOF

(71) Applicant: Panasia Co., Ltd, Busan (KR)

(72) Inventors: Soo-Tae Lee, Busan (KR); Su-Kyu Lee, Busan (KR); Jae-Bong Sung, Busan (KR)

(73) Assignee: Panasia Co., Ltd., Busan (KR)

( * ) Notice: Subject to any disclaimer, the term of this patent is extended or adjusted under 35 U.S.C. 154(b) by 673 days.

(21) Appl. No.: 17/255,802

(22) PCT Filed: Jun. 28, 2019

(86) PCT No.: PCT/KR2019/007922
§ 371 (c)(1),
(2) Date: Dec. 23, 2020

(87) PCT Pub. No.: WO2020/005030
PCT Pub. Date: Jan. 2, 2020

(65) Prior Publication Data
US 2021/0146298 A1 May 20, 2021

(30) Foreign Application Priority Data
Jun. 28, 2018 (KR) .................. 10-2018-0074449

(51) Int. Cl.
*B01D 53/14* (2006.01)
*B01D 21/00* (2006.01)
(Continued)

(52) U.S. Cl.
CPC ..... *B01D 53/1425* (2013.01); *B01D 21/0012* (2013.01); *B01D 21/0024* (2013.01);
(Continued)

(58) Field of Classification Search
CPC ............ B01D 53/1425; B01D 21/0012; B01D 21/0024; B01D 21/0045; B01D 21/01;
(Continued)

(56) References Cited

U.S. PATENT DOCUMENTS 5,340,547 A * 8/1994 Moser .................. B01D 53/501
422/111
2014/0231320 A1 * 8/2014 Lee ...................... B01D 29/682
210/108

(Continued)

FOREIGN PATENT DOCUMENTS

| JP | H08-010548 A | 1/1996 |
| JP | H08-168830 B | 7/1996 |

(Continued)

OTHER PUBLICATIONS

International Search Report and Written Opinion dated Oct. 25, 2019, issued in PCT Application No. PCT/KR2019/007922, filed Jun. 28, 2019.

*Primary Examiner* — Stephen Hobson
(74) *Attorney, Agent, or Firm* — Workman Nydegger

(57) ABSTRACT

A flue gas cleaning solution purification system includes: a scrubber for removing contaminants from flue gas by using a cleaning solution; a cleaning solution purification unit for purifying the contaminated cleaning solution discharged from the scrubber; a cleaning solution resupply unit for resupplying the cleaning solution having been purified by the cleaning solution purification unit to the scrubber; and a sludge treatment unit for treating and storing sludge discharged from the cleaning solution purification unit, wherein the cleaning solution purification unit includes: a circulation buffer tank for temporarily storing the discharged contaminated cleaning solution; a coagulant supply apparatus for supplying a coagulant which coagulates contaminants of the contaminated cleaning solution discharged from the scrub-
(Continued)

ber; a settling apparatus for primarily purifying the contaminated cleaning solution discharged from the scrubber by enabling settling of the contaminants; and a filtering apparatus for secondarily purifying the cleaning solution by filtering the contaminated cleaning solution to remove the contaminants.

15 Claims, 9 Drawing Sheets

(51) Int. Cl.
| | |
|---|---|
| B01D 21/01 | (2006.01) |
| B01D 21/24 | (2006.01) |
| B01D 21/32 | (2006.01) |
| B01D 29/68 | (2006.01) |
| C02F 1/00 | (2023.01) |
| C02F 9/00 | (2023.01) |
| C02F 11/122 | (2019.01) |
| C02F 11/125 | (2019.01) |
| C02F 1/52 | (2023.01) |

(52) U.S. Cl.
CPC ......... *B01D 21/0045* (2013.01); *B01D 21/01* (2013.01); *B01D 21/2444* (2013.01); *B01D 21/32* (2013.01); *B01D 29/682* (2013.01); *B01D 53/1481* (2013.01); *C02F 1/008* (2013.01); *C02F 9/00* (2013.01); *C02F 11/122* (2013.01); *C02F 11/125* (2013.01); *B01D 2201/082* (2013.01); *C02F 1/001* (2013.01); *C02F 2001/007* (2013.01); *C02F 1/5281* (2013.01); *C02F 2201/005* (2013.01)

(58) Field of Classification Search
CPC .. B01D 21/2444; B01D 21/32; B01D 29/682; B01D 53/1481; B01D 2201/082; B01D 2247/04; B01D 2252/103; B01D 53/96; B01D 53/50; B01D 2258/0283; B01D 21/24; B01D 47/06; B01D 53/78; B01D 36/04; B01D 21/0048; B01D 21/245; B01D 21/30; B01D 35/02; B01D 47/063; C02F 1/008; C02F 9/00; C02F 11/122; C02F 11/125; C02F 1/001; C02F 1/5281; C02F 2001/007; C02F 2201/005; C02F 1/52; C02F 2101/101; C02F 2101/16; C02F 2103/18; C02F 2201/001
See application file for complete search history.

(56) References Cited

U.S. PATENT DOCUMENTS

| | | | |
|---|---|---|---|
| 2014/0238911 A1* | 8/2014 | Lee | B01D 29/52 |
| | | | 210/108 |
| 2014/0246378 A1* | 9/2014 | Lee | B01D 29/117 |
| | | | 210/741 |
| 2018/0037308 A1* | 2/2018 | Lee | C02F 1/008 |
| 2018/0099890 A1* | 4/2018 | Syal | B01D 21/0084 |

FOREIGN PATENT DOCUMENTS

| | | | | |
|---|---|---|---|---|
| JP | 2004136208 A | * | 5/2004 | |
| JP | 4655447 B2 | | 3/2011 | |
| KR | 10-0987462 B1 | | 10/2010 | |
| KR | 10-1012752 A | | 2/2011 | |
| KR | 10-1581315 A | | 12/2015 | |
| KR | 10-1776841 B1 | | 9/2017 | |
| KR | 10-2017-012618 A | | 11/2017 | |
| KR | 10-2018-0036508 A | | 4/2018 | |
| WO | WO-2012044759 A2 | * | 4/2012 | ............ B01D 47/14 |
| WO | WO-2015060332 A1 | * | 4/2015 | ........ B01D 53/1425 |
| WO | WO-2015092972 A1 | * | 6/2015 | ........ B01D 21/0042 |

\* cited by examiner

FLUE GAS CLEANING SOLUTION PURIFICATION SYSTEM AND METHOD THEREOF

TECHNICAL FIELD

The present disclosure relates to a flue gas cleaning solution purification system and, more specifically, to a flue gas cleaning solution purification system including: a scrubber for removing contaminants such as sulfur oxides from flue gas by using a cleaning solution; a cleaning solution purification unit for purifying the contaminated cleaning solution discharged from the scrubber; a cleaning solution resupply unit for resupplying the cleaning solution having been purified by the cleaning solution purification unit to the scrubber; and a sludge treatment unit for treating and storing sludge discharged from the cleaning solution purification unit, wherein the cleaning solution purification unit includes: a circulation buffer tank for temporarily storing the contaminated cleaning solution discharged from the scrubber; a coagulant supply apparatus for supplying a coagulant which coagulates contaminants of the contaminated cleaning solution discharged from the scrubber; a settling apparatus for primarily purifying the contaminated cleaning solution discharged from the scrubber by enabling the cleaning solution to stay therein for a predetermined time and enabling settling of the contaminants of the cleaning solution; and a filtering apparatus for secondarily purifying the cleaning solution by filtering the contaminated cleaning solution to remove the contaminants.

BACKGROUND ART

Most modern ships have an engine, a boiler, and the like for powering and heating themselves. Fuel needs to be combusted to drive the engine, boiler, and the like, and exhaust gas occurring in the combustion process includes hazardous materials such as sulfur oxide (SOx), nitrogen oxide (NOx), particulate matters (PM), and the like.

The sulfur oxide or nitrogen oxide may affect human mucous membranes and thus cause respiratory diseases, and are classified as class 1 carcinogens by International Agency for Research on Cancer under WHO. In addition, if emitted into the atmosphere with no processing, the SOx and NOx may react with moisture ($H_2O$) in the atmosphere and become sulfuric acid ($H_2SO_4$) and nitric acid ($HNO_3$), respectively, which are major causes of acid rain.

PMs refers to small particulate materials, which are contrasted with gaseous contaminants. If emitted into the atmosphere without being processed, PMs in flue gas may cause a visibility issue (for example, reduced visible distance) or may infiltrate human bodies through respiratory systems (lungs), thereby causing various diseases. Fine dust, which has recently become a domestic problem, results from the PMs, which are considered as major causes of atmospheric pollution.

Therefore, countermeasures need to be taken against such hazardous materials in flue gas. Ships, particularly, have a large-scale engine output and thus are known to emit flue gas 130 times that from cars. In order to prevent emission of such a large amount of hazardous materials, specific and substantial countermeasures against flue gas from ships are thus necessary.

Accordingly, the International Maritime Organization (hereinafter, referred to as IMO) has set emission control areas (hereinafter, referred to as ECAs) and has limited the amount of hazardous materials emitted therein. Particularly, SOx emission control areas (hereinafter, referred to as SECAs) are specified more extensively than the ECAs, in which other hazardous materials (for example, NOx) are regulated together, and more strongly regulated.

Moreover, tougher regulations have been issued as of Jan. 1, 2015 to place the upper limit of 0.1% to the content of sulfur in fuel that causes environmental pollution with regard to all ships passing through the SECAs (IMO 184 (59)). The SECAs have been expanded from the Baltic Sea and North Sea to North America regions through modification of Maritime Pollution Prevention Act in August 2011, and are expected to further expand (for example, waters near China were added thereto as of Apr. 1, 2016). As such, management of sulfur oxide emitted from ships is expected to be more important.

Moreover, the upper limit of SOx content in flue gas has already been 3.5% even in worldwide waters outside ECAs, and a law has been enacted during an IMO summit in Oct. 28, 2016 to reduce the upper limit to 0.5%. The law is expected to be effectuated as of 2020, in line with the increasing importance to manage sulfur oxide across the globe.

Methods for removing contaminants from flue gas are classified into dry methods and wet methods. The dry methods are advantageous in that costs for installation and maintenance are low, processes are simple, and wastewater processing is unnecessary, but have drawbacks in that they are heavily affected by dust, and contaminants are highly likely to be discharged without being removed. The wets methods are advantageous in that they are less affected by dust, SOx and NOx can be simultaneously removed efficiently, and the SOx removal efficiency is particularly high, but have drawbacks in that contaminated water needs to undergo wastewater processing.

In general, the wet methods are widely employed to process flue gas from ships due to the advantages of high SOx removal efficiency and less influence from dust, but pose a problem in that the cleaning solution contaminated in the flue gas cleaning process needs to be processed.

FIG. 1 illustrates the configuration of a flue gas cleaning solution purification system employing a wet method according to the prior art. Referring to FIG. 1, the conventional flue gas cleaning solution purification system removes contaminants (for example, sulfur oxide) included in flue gas through adsorption between the same and a cleaning solution supplied to a scrubber 91, and the contaminated cleaning solution discharged during this process is temporarily stored in a circulated water tank 95 and is resupplied to the scrubber 91. The system also includes a filtering apparatus 94 for reducing the degree of contamination of the circulated cleaning solution. The filtration system has a pipe dedicated to filtration, which has a circulation route of circulated water tank 95→filtering apparatus 94→circulated water tank 95, separately from the pipe having a circulation route of scrubber 91→circulated water tank 95→circulated water pipe 93→scrubber 91.

(Patent Document 1) JP8-168830 B

DETAILED DESCRIPTION OF THE INVENTION

Technical Problem

The present disclosure has been made to solve the above-mentioned problems, and an aspect of the present disclosure is to provide a flue gas cleaning solution purification system and a method thereof, wherein a contaminated cleaning solution discharged from a scrubber for removing contaminants (for example, sulfur oxide) from flue gas is purified, and the purified cleaning solution is resupplied to the scrubber, thereby reducing contaminants in the flue gas, and reducing the amount of discharged cleaning solution contaminated in the process of removing contaminants from the flue gas.

Another aspect of the present disclosure is to provide a flue gas cleaning solution purification system and a method thereof, wherein the flue gas cleaning solution purification system includes a circulation buffer tank for temporarily storing the contaminated cleaning solution discharged from the scrubber, thereby improving the stability of the cleaning solution circulation system.

Another aspect of the present disclosure is to provide a flue gas cleaning solution purification system and a method thereof, wherein a part of the contaminated cleaning solution temporarily stored in the circulation buffer tank is withdrawn, purified, and resupplied to the circulation buffer tank, thereby lowering the degree of contamination of cleaning solution resupplied to the scrubber, and preventing contaminants from clogging the pipe for supplying the cleaning solution to the scrubber and the nozzle for spraying the cleaning solution inside the scrubber.

Another aspect of the present disclosure is to provide a flue gas cleaning solution purification system and a method thereof, wherein a coagulant is supplied to facilitate coagulation of contaminants in the contaminated cleaning solution, thereby improving the efficiency of cleaning solution purification.

Another aspect of the present disclosure is to provide a flue gas cleaning solution purification system and a method thereof, wherein the system includes a settling apparatus for primarily purifying the contaminated cleaning solution such that contaminants having large particles are purified by the settling apparatus, thereby reducing the load on a serially-connected filtering apparatus, such that the system can operate for a long period of time.

Another aspect of the present disclosure is to provide a flue gas cleaning solution purification system and a method thereof, wherein the system includes an inclined module having multiple inclined plates installed to be spaced apart by a predetermined interval such that the contaminated solution flows obliquely between the inclined plates from the lower side to the upper side, thereby separating contaminants.

Another aspect of the present disclosure is to provide a flue gas cleaning solution purification system and a method thereof, wherein agitation of the cleaning solution and the coagulant occurs in the coagulation reaction tank disposed at the upper portion of one side inside the settling tank such that the size of contaminants included in the cleaning solution is increased, thereby facilitating the separation of contaminants in the settling tank.

Another aspect of the present disclosure is to provide a flue gas cleaning solution purification system and a method thereof, wherein the system includes a discharge module having a lower blocking wall and an upper blocking wall disposed so as to intersect such that the cleaning solution that has passed through the separation tank overflows the lower/upper blocking wall and is then discharged, thereby additionally removing remaining contaminants.

Another aspect of the present disclosure is to provide a flue gas cleaning solution purification system and a method thereof, wherein the system includes a water-quality inspection device for monitoring the quality of supernatant water purified in the settling apparatus so as to determine whether or not to conduct secondary purification in the filtering apparatus according to the quality of the supernatant water, thereby guaranteeing efficient system operations.

Another aspect of the present disclosure is to provide a flue gas cleaning solution purification system and a method thereof, wherein the filtering apparatus includes an automatic washing unit such that the filtering apparatus can operate for a long period of time.

Another aspect of the present disclosure is to provide a flue gas cleaning solution purification system and a method thereof, wherein the filtering apparatus can be automatically washed through a backwashing method, and the backwashing is possible even when the filtering apparatus is filtering the contaminated cleaning solution.

Another aspect of the present disclosure is to provide a flue gas cleaning solution purification system and a method thereof, wherein the system includes a control device for controlling the valve on the basis of information regarding pressures at the inlet end, outlet end, and discharge end of the filtering apparatus, respectively, such that backwashing proceeds efficiently and automatically.

Another aspect of the present disclosure is to provide a flue gas cleaning solution purification system and a method thereof, wherein the filtering apparatus is configured to operate in a filtration mode and in a bypass mode in which the introduced cleaning solution is discharged with no filtering process such that, even in a situation in which the filtering apparatus cannot operate in the filtration mode, the entire system can continuously operate with no suspension.

Another aspect of the present disclosure is to provide a flue gas cleaning solution purification system and a method thereof, wherein the cleaning solution purified in the cleaning solution purification is directly resupplied to the scrubber such that a high-purity cleaning solution can be provided back to the scrubber.

Another aspect of the present disclosure is to provide a flue gas cleaning solution purification system and a method thereof, wherein the cleaning solution purified in the cleaning solution purification unit is resupplied to the scrubber via the circulation buffer tank, thereby reducing the load on the cleaning solution purification unit.

Another aspect of the present disclosure is to provide a flue gas cleaning solution purification system and a method thereof, wherein the system includes a dehydrating apparatus for collecting the cleaning solution contained in sludge discharged from the cleaning solution purification unit and supplying the same to the settling apparatus such that the amount of sludge discharged out of the ship can be reduced, and the system efficiency can be improved.

Technical Solution

The present disclosure, in accordance with the above-described aspects, is implemented by embodiments configured as follows.

According to an embodiment of the present disclosure, the present disclosure is characterized by including: a scrubber configured to remove contaminants such as sulfur oxides from flue gas by using a cleaning solution; a cleaning solution purification unit configured to purify the contaminated cleaning solution discharged from the scrubber; and a cleaning solution resupply unit configured to resupply the cleaning solution having been purified by the cleaning solution purification unit to the scrubber.

According to another embodiment of the present disclosure, the present disclosure is characterized in that the cleaning solution purification unit includes a settling apparatus configured to purify the contaminated cleaning solution discharged from the scrubber by enabling the cleaning solution to stay therein for a predetermined time and enabling settling of contaminants.

According to still another embodiment of the present disclosure, the present disclosure is characterized in that the settling apparatus includes a settling tank configured to discharge thickened sludge obtained by settling of the contaminants contained in the contaminated cleaning solution introduced thereinto, and the settling tank includes an inclined module including multiple inclined plates installed to be spaced a predetermined distance apart from each other, so as to separate the contaminants from the contaminated cleaning solution while the contaminated cleaning solution obliquely flows upwards from the bottom between the inclined plates.

According to an embodiment of the present disclosure, the present disclosure is characterized in that the settling tank includes a sludge thickening vessel formed to have a wide upper end portion and a narrow lower end portion such that smooth sludge thickening is maintained.

According to another embodiment of the present disclosure, the present disclosure is characterized in that the settling apparatus includes an inlet pipe connected to an upper portion of the settling tank to guide the contaminated cleaning solution to the settling tank, a sludge buffer tank configured to temporarily store thickened sludge discharged from the settling tank, and a supernatant water storage tank configured to temporarily store supernatant water obtained by removing contaminants from the contaminated cleaning solution.

According to still another embodiment of the present disclosure, the present disclosure is characterized in that the cleaning solution purification unit includes a filtering apparatus configured to purify the contaminated cleaning solution by filtering the cleaning solution to remove the contaminants.

According to an embodiment of the present disclosure, the present disclosure is characterized in that the settling apparatus includes a supernatant water outlet pipe configured to enable the supernatant water stored in the supernatant water storage tank to flow out therethrough, and the cleaning solution purification unit includes a water-quality monitoring device configured to monitor a water quality of the supernatant water flowing out through the supernatant water outlet pipe.

According to another embodiment of the present disclosure, the present disclosure is characterized in that the supernatant water outlet pipe is branched into two pipes and includes a first supernatant water outlet branch pipe configured to supply the supernatant water having flowed out from the supernatant water storage tank to the filtering apparatus, and a second supernatant water outlet branch pipe configured to supply the supernatant water having flowed out from the supernatant water storage tank to the cleaning solution resupply unit.

According to still another embodiment of the present disclosure, the present disclosure is characterized by including a control device configured to, based on a result of the water-quality monitoring device, supply the supernatant water stored in the supernatant water storage tank to the filtering apparatus through the first supernatant water outlet branch pipe if that a water quality of the supernatant water is lower than a set standard, and supply the stored supernatant water to the cleaning solution resupply unit through the second supernatant water outlet branch pipe if that the water quality of the supernatant water is higher than the set standard.

According to an embodiment of the present disclosure, the present disclosure is characterized in that the filtering apparatus includes a mesh configured to filter the contaminated cleaning solution and an automatic washing unit configured to remove contaminants adhering to the mesh.

According to another embodiment of the present disclosure, the present disclosure is characterized in that the automatic washing unit includes a suction unit configured to suction backwashing water containing the contaminants adhering to the mesh, a discharge unit containing one side of the suction unit so as to discharge the backwashing water having been suctioned by the suction unit, a driving unit configured to provide power, and a driven unit configured to receive the power transferred from the driving unit so as to mechanically rotate the suction unit.

According to still another embodiment of the present disclosure, the present disclosure is characterized in that the filtering apparatus is configured to operate in a filtration mode of filtering the introduced contaminated cleaning solution through the mesh, and a bypass mode of discharging the introduced contaminated cleaning solution as it is through a bypass route without a filtration process.

According to an embodiment of the present disclosure, the present disclosure is characterized in that the cleaning solution purification unit includes a circulation buffer tank configured to temporarily store the contaminated cleaning solution discharged from the scrubber.

According to another embodiment of the present disclosure, the present disclosure is characterized in that the cleaning solution purification unit includes a coagulant supply apparatus configured to supply a coagulant which coagulates the contaminants of the contaminated cleaning solution discharged from the scrubber.

According to still another embodiment of the present disclosure, the present disclosure is characterized in that the settling tank includes a coagulation reaction tank disposed at an upper portion of one side inside the settling tank such that the introduced contaminated cleaning solution is agitated with the coagulant supplied from the coagulant supply apparatus.

According to an embodiment of the present disclosure, the present disclosure is characterized in that the cleaning solution resupply unit is configured to resupply the cleaning solution purified by the cleaning solution purification unit directly to the scrubber.

According to another embodiment of the present disclosure, the present disclosure is characterized in that the cleaning solution resupply unit is configured to resupply the cleaning solution purified by the cleaning solution purification unit to the scrubber via the circulation buffer tank.

According to still another embodiment of the present disclosure, the present disclosure is characterized in that the cleaning solution resupply unit is configured to extend as a single pipe branching off into a pipe for resupplying a part of the cleaning solution stored in the circulation buffer tank to the scrubber, and another pipe for resupplying the cleaning solution purified by the cleaning solution purification unit to the scrubber.

According to an embodiment of the present disclosure, the present disclosure is characterized in that the flue gas cleaning solution purification system includes a sludge treatment unit configured to treat and store the sludge discharged from the cleaning solution purification unit, and the sludge treatment unit includes a dehydrating apparatus configured to collect the cleaning solution contained in the sludge discharged from the cleaning solution purification unit and then supply the collected cleaning solution to the settling apparatus, and a dehydrated cake storage vessel configured to store the dehydrated sludge.

According to still another embodiment of the present disclosure, the present disclosure is characterized in that the inlet pipe is a confluent pipe including a first inlet branch pipe configured to guide the contaminated cleaning solution from the circulation buffer tank to the settling tank and a second inlet branch pipe configured to guide the contaminated cleaning solution having been collected by the dehydrating apparatus to the settling tank.

According to an embodiment of the present disclosure, the present disclosure is characterized in that the inlet pipe includes a tree-way valve disposed at a point where the first inlet branch pipe and the second inlet branch pipe join such that a route of the contaminated cleaning solution introduced into the settling tank can be determined in accordance with adjustment of the three-way valve.

According to another embodiment of the present disclosure, the present disclosure is characterized in that the dehydrating apparatus includes a cylindrical filtering body and a screw rotatably inserted into the filtering body, and the cleaning solution is collected by the filtering body while the sludge introduced from one end side of the screw is supplied to a space between the filtering body and the screw and is then transported to the other end side of the screw by means of rotation of the screw.

According to still another embodiment of the present disclosure, the present disclosure is characterized in that the dehydrating apparatus includes a plurality of filtration plates which are horizontally movable and installed to be spaced a predetermined distance apart from each other and a pressurizing means configured to horizontally pressurize the filtration plates, and the cleaning solution is collected from the sludge supplied to a space between the filtration plates by means of pressurization of the filtration plates.

According to an embodiment of the present disclosure, the present disclosure is characterized by including: a gas cleaning operation of removing, by a scrubber, contaminants such as sulfur oxides from flue gas by using a cleaning solution; a cleaning solution purification operation of purifying, by a cleaning solution purification unit, the contaminated cleaning solution supplied from the scrubber; and a cleaning solution resupply operation of resupplying, by a cleaning solution resupply unit, the purified cleaning solution purified by the cleaning solution purification unit to the scrubber.

According to another embodiment of the present disclosure, the present disclosure is characterized in that the cleaning solution purification operation includes a first purification operation in which the settling apparatus purifies the cleaning solution discharged from the scrubber by causing the same to stay for a predetermined time and settling contaminants.

According to still another embodiment of the present disclosure, the present disclosure is characterized in that the first purification operation includes: a contaminated water inflow operation in which the contaminated cleaning solution flows into the settling tank; a settling operation in which the contaminated cleaning solution is made to stay in the settling tank such that contaminants are settled; a supernatant water outflow operation in which supernatant water obtained by removing the settled contaminants from the contaminated cleaning solution flows out; and a sludge discharge operation in which sludge formed by settling contaminants from the contaminated cleaning solution is discharged.

According to an embodiment of the present disclosure, the present disclosure is characterized in that the cleaning solution purification operation includes a coagulant supply step in which a coagulant supply device supplies a coagulant for coagulating contaminants in the contaminated cleaning solution discharged from the scrubber.

According to another embodiment of the present disclosure, the present disclosure is characterized in that the cleaning solution purification operation includes a second purification operation in which the filtering apparatus filters the supernatant water flowing out of the settling apparatus so as to purify the same by filtering out contaminants.

According to still another embodiment of the present disclosure, the present disclosure is characterized in that the second purification operation includes an automatic washing operation in which contaminants are removed from the mesh of the filtering apparatus.

According to another embodiment of the present disclosure, the present disclosure is characterized in that the automatic washing operation includes: a sensing operation of measuring the inflow pressure and outflow pressure of the filtering apparatus and determining whether or not the difference between the measured pressures exceeds a predetermined range; a suction operation of opening the discharge unit of the automatic washing unit if a pressure difference exceeding the predetermined range occurs such that the suction unit suctions backwashing water including contaminants attached to the mesh; and a discharge operation in which the discharge unit discharges the backwashing water suctioned from the suction unit.

According to still another embodiment of the present disclosure, the present disclosure is characterized in that the fuel gas cleaning solution purification method includes a sludge treatment operation in which the sludge treatment unit treats and stores sludge discharged from the cleaning solution purification unit.

According to still another embodiment of the present disclosure, the present disclosure is characterized in that the sludge treatment operation includes a dehydrating operation of collecting the cleaning solution contained in sludge discharged from the cleaning solution purification unit; a resupply operation of supplying the collected cleaning solution to the settling apparatus; and a dehydrated cake discharge operation of discharging dehydrated sludge to a dehydrated cake storage tank.

Advantageous Effects

The present disclosure may have the following advantageous effects as a result of a combination/usage of the above-described embodiments and configurations described below.

The present disclosure has an advantageous effect in that the contaminated cleaning solution discharged from the scrubber for removing contaminants from flue gas (for example, sulfur oxide) is purified, and the purified cleaning solution is resupplied to the scrubber, thereby reducing contaminants in the flue gas, and also reducing the amount of discharged cleaning solution contaminated in the process of removing contaminants from the flue gas.

The present disclosure has an advantageous effect derived from the fact that the same includes a circulation buffer tank for temporarily storing the contaminated cleaning solution discharged from the scrubber, thereby improving the stability of the cleaning solution circulation system.

The present disclosure has an advantageous effect in that a part of the contaminated cleaning solution temporarily stored in the circulation buffer tank is withdrawn, purified, and resupplied to the circulation buffer tank, thereby lowering the degree of contamination of cleaning solution resupplied to the scrubber, and preventing contaminants from clogging the pipe for supplying the cleaning solution to the scrubber and the nozzle for spraying the cleaning solution inside the scrubber.

The present disclosure has an advantageous effect in that a coagulant is supplied to facilitate coagulation of contaminants in the contaminated cleaning solution, thereby improving the efficiency of cleaning solution purification.

The present disclosure has an advantageous effect derived from the fact that same includes a settling apparatus for primarily purifying the contaminated cleaning solution such that contaminants having large particles are purified by the settling apparatus, thereby reducing the load on a serially-connected filtering apparatus, such that the same can operate for a long period of time.

The present disclosure has an advantageous effect in that the same includes an inclined module having multiple inclined plates installed to be spaced apart by a predetermined interval such that the contaminated solution flows obliquely between the inclined plates from the lower side to the upper side, thereby separating contaminants.

The present disclosure has an advantageous effect in that agitation of the cleaning solution and the coagulant occurs in the coagulation reaction tank disposed at the upper portion of one side inside the settling tank such that the size of contaminants included in the cleaning solution is increased, thereby facilitating the separation of contaminants in the settling tank.

The present disclosure has an advantageous effect derived from the fact the same includes a discharge module having a lower blocking wall and an upper blocking wall disposed so as to intersect such that the cleaning solution that has passed through the separation tank overflows the lower/upper blocking wall and is then discharged, thereby additionally removing remaining contaminants.

The present disclosure has an advantageous effect in that the same includes a water-quality inspection device for monitoring the quality of supernatant water purified in the settling apparatus so as to determine whether or not to conduct secondary purification in the filtering apparatus according to the quality of the supernatant water, thereby guaranteeing efficient system operations.

The present disclosure has an advantageous effect derived from the fact the filtering apparatus includes an automatic washing unit such that the filtering apparatus can operate for a long period of time.

The present disclosure has an advantageous effect derived from the fact the filtering apparatus can be automatically washed through a backwashing method, and the backwashing is possible even when the filtering apparatus is filtering the contaminated cleaning solution.

The present disclosure has an advantageous effect in that the same includes a control device for controlling the valve on the basis of information regarding pressures at the inlet end, outlet end, and discharge end of the filtering apparatus, respectively, such that backwashing proceeds efficiently and automatically.

The present disclosure has an advantageous effect derived from the fact the filtering apparatus is configured to operate in a filtration mode and in a bypass mode in which the introduced cleaning solution is discharged with no filtering process such that, even in a situation in which the filtering apparatus cannot operate in the filtration mode, the entire system can continuously operate with no suspension.

The present disclosure has an advantageous effect derived from the fact the cleaning solution purified in the cleaning solution purification is directly resupplied to the scrubber such that a high-purity cleaning solution can be provided back to the scrubber.

The present disclosure has an advantageous effect derived from the fact the cleaning solution purified in the cleaning solution purification unit is resupplied to the scrubber via the circulation buffer tank, thereby reducing the load on the cleaning solution purification unit.

The present disclosure has an advantageous effect derived from the fact the same includes a dehydrating apparatus for collecting the cleaning solution contained in sludge discharged from the cleaning solution purification unit and supplying the same to the settling apparatus such that the amount of sludge discharged out of the ship can be reduced, and the system efficiency can be improved.

MODE FOR CARRYING OUT THE INVENTION

Figure 1:
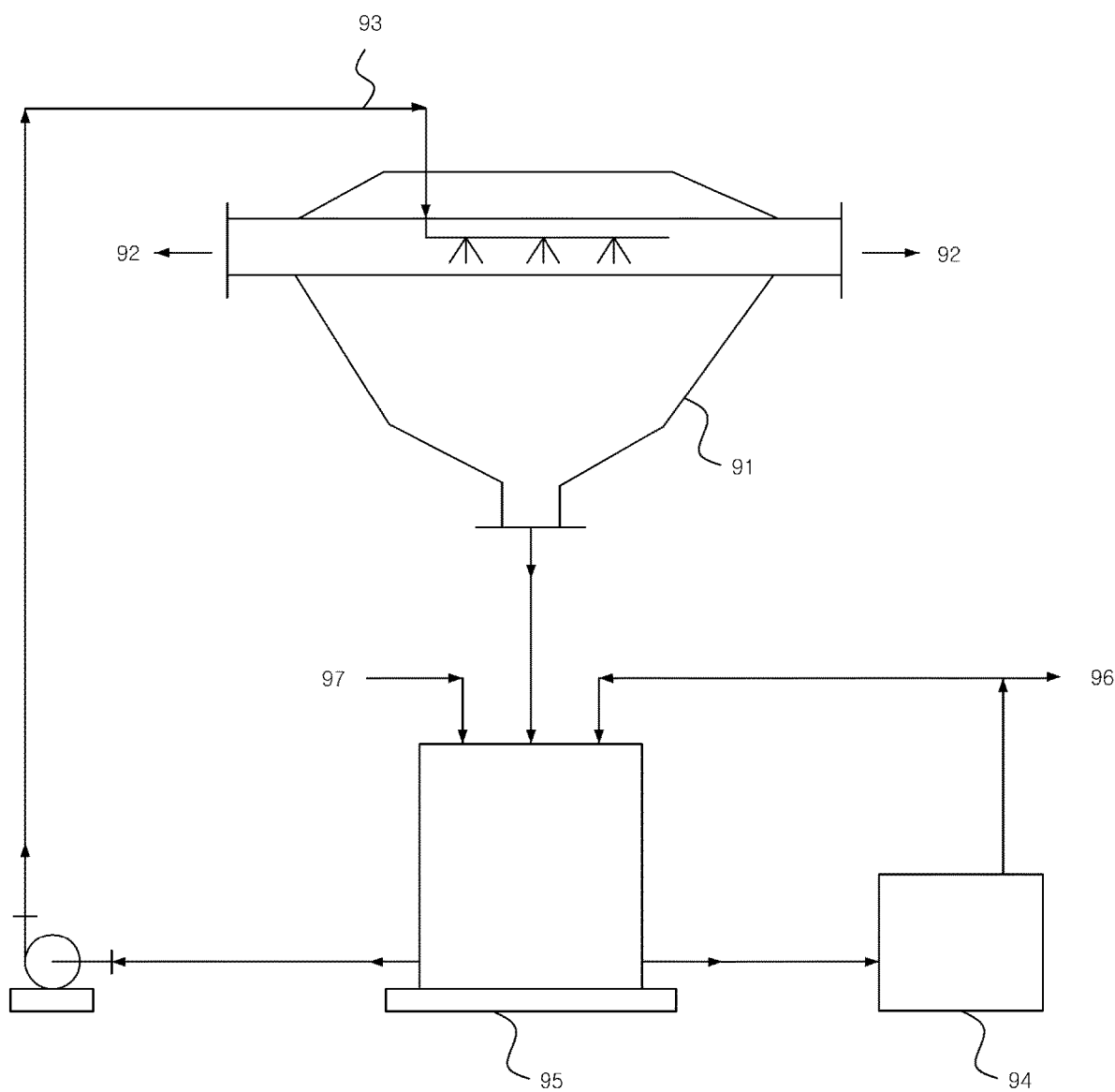
FIG. 1 illustrates a conventional flue gas cleaning solution purification system.

Detailed description of a flue gas cleaning solution purification system according to the present disclosure will be given below with reference to attached drawings. Throughout the specification, the same or like reference numerals designate the same or like elements in the drawings. In addition, detailed description of known functions and configurations that may unnecessarily obscure the subject matter of the present disclosure will be omitted. Unless otherwise defined, all terms of the specification have meanings which are the same as the general meanings of the corresponding terms, which are understood by those skilled in the technical field to which the present disclosure belongs and, if the meaning of a term used in the present disclosure and the general meaning of the corresponding term conflict with each other, the definition used in the present disclosure is applied.

Figure 2:
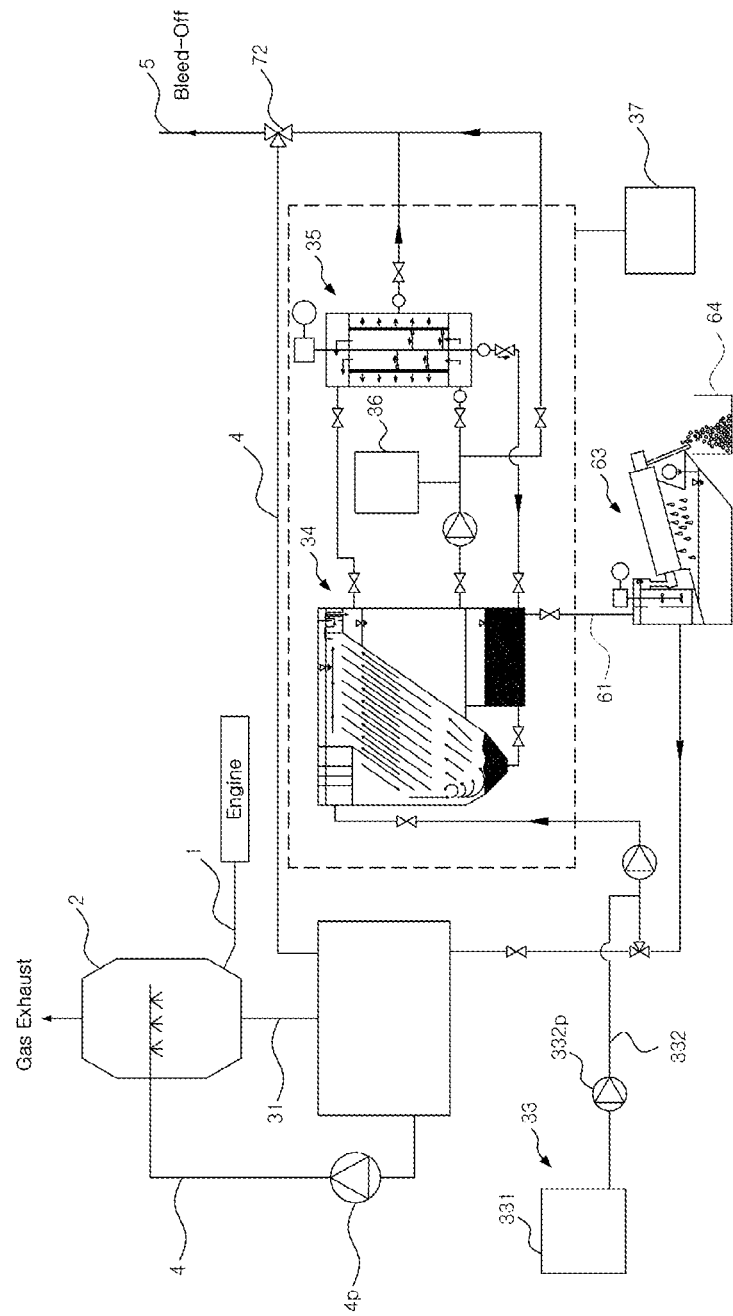
FIG. 2 illustrates a configuration of a flue gas cleaning solution purification system according to one embodiment of the present disclosure.
Figure 3:
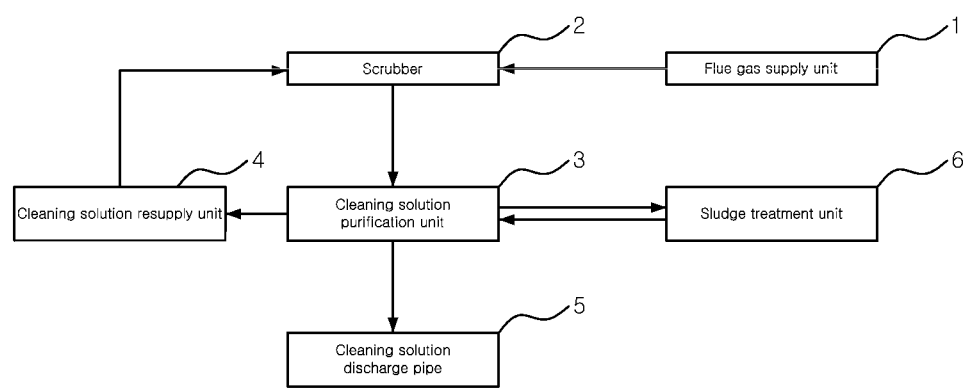
FIG. 3 is a block diagram of the flue gas cleaning solution purification system according to FIG. 2.

FIG. 2 illustrates a configuration of a flue gas cleaning solution purification system according to one embodiment of the present disclosure, and FIG. 3 is a block diagram of the flue gas cleaning solution purification system according to FIG. 2. Referring to FIGS. 2 and 3, a flue gas cleaning solution purification system according to the present disclosure includes: a flue gas supply unit 1 for enabling flue gas to flow into a scrubber 2; the scrubber 2 for removing contaminants such as sulfur oxides from the flue gas by means of adsorption between the contaminants and a cleaning solution; a cleaning solution purification unit 3 for purifying the contaminated cleaning solution supplied from the scrubber 2; a cleaning solution resupply unit 4 for resupplying, to the scrubber 2, the purified cleaning solution; a cleaning solution discharge pipe 5 for enabling the purified cleaning solution to be discharged out of a ship; and a sludge treatment unit 6 for treating and storing sludge discharged from the cleaning solution purification unit 3.

The flue gas supply unit 1 is configured to enable flue gas generated in a ship to flow into the scrubber 2 (described later), and has one side connected to a large diesel engine such as a main engine or an auxiliary engine of the ship, so that the flue gas containing contaminants such as sulfur oxides flows into the scrubber.

The scrubber 2 removes the contaminants such as sulfur oxides contained in the flue gas introduced from the flue gas supply unit 1 by means of adsorption between the contaminants and the cleaning solution supplied to the scrubber 2. The cleaning solution may be included at the beginning of a process of cleaning flue gas or added during system operation.

During operation of the system according to the present disclosure, the cleaning solution having been supplied to the scrubber 2 is atomized and sprayed inside the scrubber, particles of the contaminants such as sulfur oxides contained in the flue gas are adsorbed onto the atomized cleaning solution to be separated from the flue gas, the contaminated cleaning solution containing the contaminant particles adsorbed thereto is purified by the cleaning solution purification unit 3 (described later), and the purified cleaning solution is resupplied to the scrubber 2 through the cleaning solution resupply unit 4 (described later) so as to be circulated. Thus, the purified cleaning solution has a reduced amount of the contaminants, but a small amount of the contaminants may still leave in the purified cleaning solution.

Figure 4:
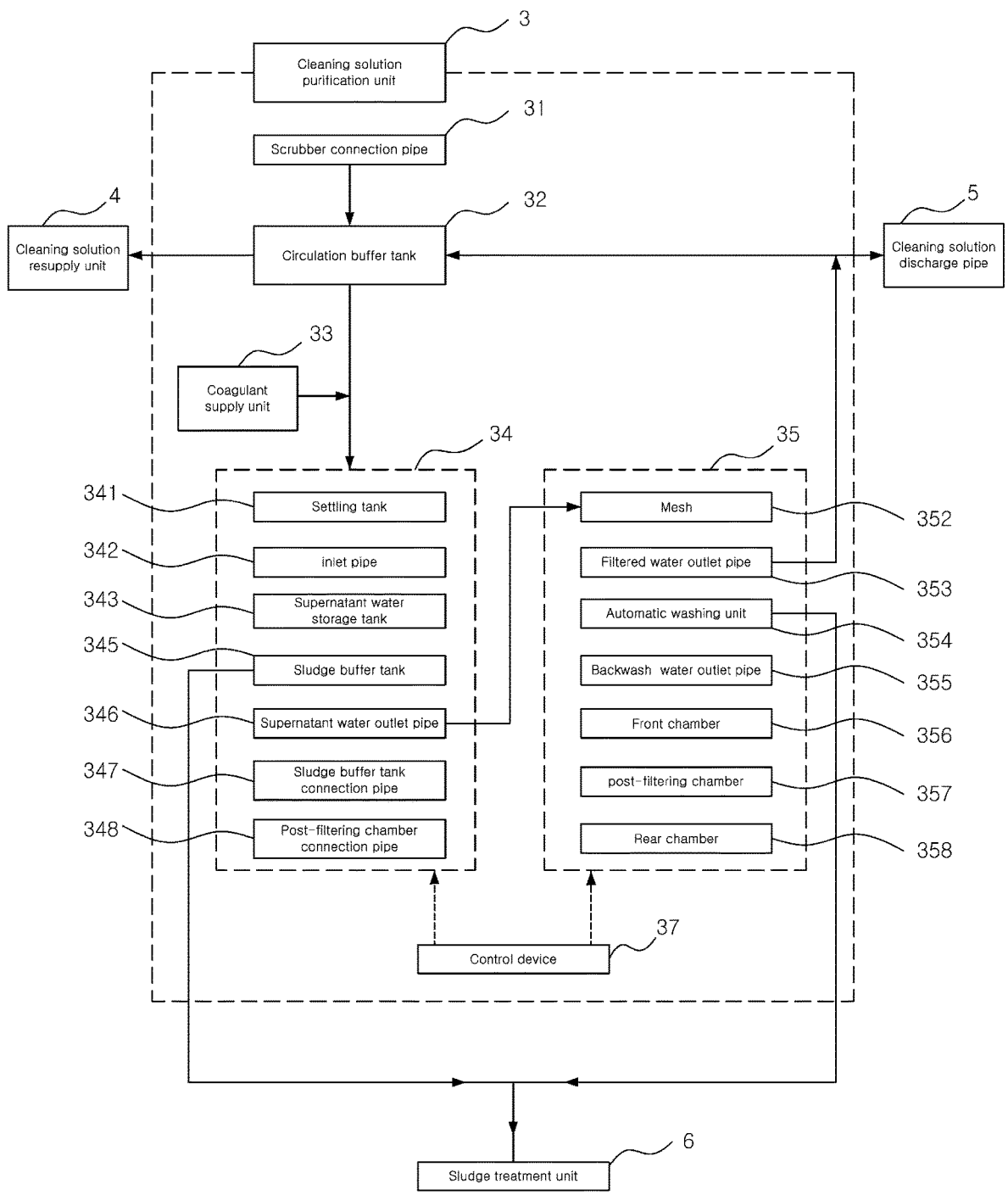
FIG. 4 is a block diagram of the cleaning solution purification unit according to FIG. 2.

FIG. 4 is a block diagram of the cleaning solution purification unit according to FIG. 2. Referring to FIGS. 2 to 4, the cleaning solution purification unit 3 purifies the contaminated cleaning solution discharged from the scrubber 2, and includes: a scrubber connection pipe 31; a circulation buffer tank 32; a coagulant supply apparatus 33; a settling apparatus 34; a filtering apparatus 35; a water-quality determination device 36; and a control device 37.

The scrubber connection pipe 31 has one end connected to the scrubber 2 and the other end connected to the circulation buffer tank 32 (described later), so as to enable the contaminated cleaning solution discharged from the scrubber 2 to be supplied to the cleaning solution purification unit 3.

The circulation buffer tank 32 is connected to the scrubber connection pipe 31 to temporarily store the contaminated cleaning solution discharged from the scrubber 2, is connected to a contaminated water inlet pipe 342 (described later) to transport the contaminated cleaning solution to the settling apparatus 34, and is connected to the cleaning solution resupply unit 4 (described later) to resupply the temporarily stored cleaning solution to the scrubber 2. The cleaning solution resupply unit 4 is preferably connected to a lower end lateral portion of the circulation buffer tank 2, and the contaminated water inlet pipe 342 is preferably connected to the bottom of the circulation buffer tank 2. Since a contamination level of the cleaning solution temporarily stored in the circulation buffer tank 2 may increase toward the bottom of the circulation buffer tank due to sedimentation of the contaminants, and the settled contaminants may exist at the bottom thereof, the cleaning solution having a relatively low contamination level is preferably resupplied to the scrubber 2, and the cleaning solution having a relatively high contamination level is preferably transported to the settling apparatus 34 (described later) together with the settled contaminants.

In the present disclosure, the circulation buffer tank 32 has an effect of increasing stability of a system of circulating the cleaning solution. For example, when the settling apparatus 34 (described later) or the filtering apparatus 35 (described later) malfunctions or is required to be inspected during operation of the system according to the present disclosure, the entire system is not immediately stopped and even during operation of the scrubber 2, the cleaning solution is circulated according to a closed loop of "the scrubber 2→the circulation buffer tank 32→the cleaning solution resupply unit 4→the scrubber 2", so that the operation of the scrubber 2 can be maintained for a predetermined time. Even if the cleaning solution is circulated without passing through a purification process in the above way, the contamination level of the cleaning solution is not significantly deteriorated due to the circulation buffer tank 32 that temporarily stores the cleaning solution, so that the scrubber 2 can be temporarily operated.

In addition, the circulation buffer tank 32 has an effect of diversifying, in accordance with an operation situation of the system, a method of supplying, by the cleaning solution resupply unit 4 (described later), the purified cleaning solution to the scrubber 2. When the contaminated cleaning solution temporarily stored in the circulation buffer tank 32 is partially taken out to be purified, and the purified cleaning solution is resupplied to the scrubber 2 through the circulation buffer tank 32, an amount of the cleaning solution to be purified in the system may be decreased, and the purified cleaning solution flows into the circulation buffer tank 32 again, so that the contamination level of the cleaning solution stored in the circulation buffer tank 32 is maintained to be low. Therefore, problems including system pipe blockage due to contaminant sedimentation generated by fouling or scaling during a process of circulating a cleaning solution through a system, formation of a large cluster of contaminants inside the scrubber 2, or the like can be prevented.

The coagulant supply apparatus 33 is connected to the contaminated water inlet pipe 342 (described later) to supply a coagulant to the contaminated cleaning solution flowing from the circulation buffer tank 32, and includes a coagulant storage tank 331, a coagulant supply pipe 332, and a coagulant supply pump 332p.

The coagulant storage tank 331 stores a coagulant. The coagulant increases a size of a cluster of the contaminants by coagulating the contaminants contained in the cleaning solution and thus, enables settling and filtering of the contaminants to be efficiently performed by the settling apparatus 34 (described later) and the filtering apparatus 35 (described later).

The coagulant supply pipe 332 has one end connected to the coagulant storage tank 331 and the other end connected to the contaminated water inlet pipe 342 (described later), so that the coagulant stored in the coagulant storage tank 331 is supplied to the settling apparatus 34 through the contaminated water inlet pipe 342. To this end, the coagulant supply pipe 332 may include the coagulant supply pump 332*p*.

Figure 5:
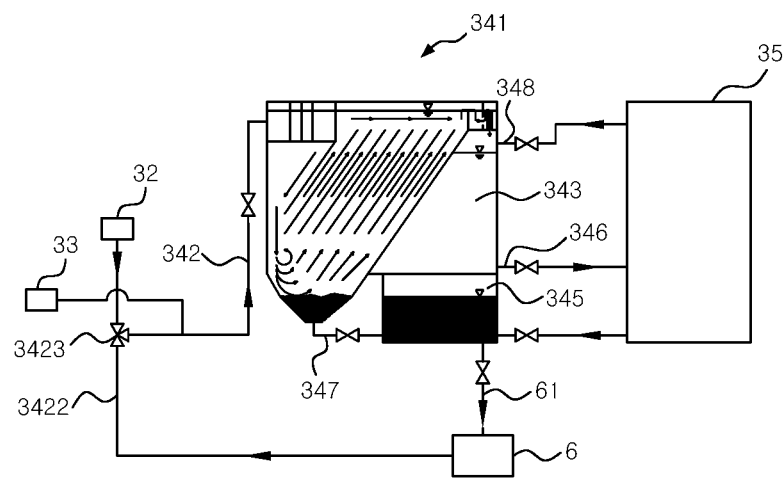
FIG. 5 illustrates a configuration of the settling apparatus according to FIG. 2.
Figure 6:
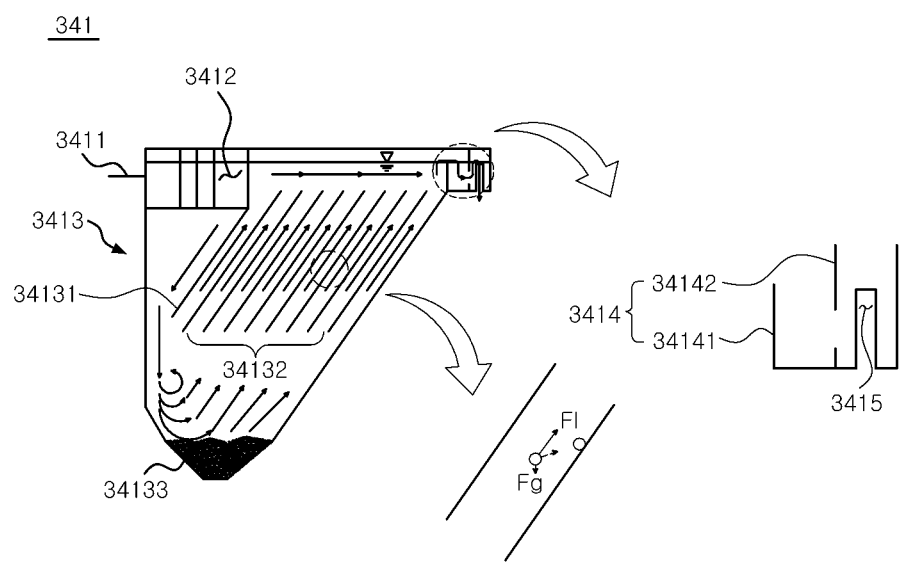
FIG. 6 illustrates a configuration of the settling tank according to FIG. 2.

FIG. 5 illustrates a configuration of the settling apparatus according to FIG. 2, and FIG. 6 illustrates a configuration of a settling tank according to FIG. 2. Referring to FIGS. 2 to 6, the settling apparatus 34 primarily purifies the contaminated cleaning solution discharged from the scrubber 2 by storing the contaminated cleaning solution and enabling settling of the contaminants of the contaminated cleaning solution, and includes a settling tank 341, an inlet pipe 342, a supernatant water storage tank 343, a sludge buffer tank 345, a supernatant water outlet pipe 346, a sludge buffer tank connection pipe 347, and a post-filtering chamber connection pipe 348.

The settling tank 341 primarily purifies the contaminated cleaning solution by enabling the contaminated cleaning solution to stay therein for a predetermined time and enabling settling of the contaminants of the contaminated cleaning solution, and includes an inlet port 3411, a coagulation reaction tank 3412, a separation tank 3413, a discharge module 3414, and an outlet port 3415.

The inlet port 3411 is connected to the inlet pipe 342 (described later) to guide the contaminated cleaning solution to the settling tank 341.

The coagulation reaction tank 3412 is a part which is disposed at an upper portion of one side of the inside of the settling tank 341 and in which the contaminated cleaning solution introduced from the outside and the coagulant are agitated, and increases the size of the cluster of the contaminants contained in the cleaning solution so as to enable separation of the contaminants to be efficiently performed in the settling tank 341.

The separation tank 3413 is a part in which the contaminants contained in the cleaning solution is separated from the cleaning solution through a settling process inside the settling tank 341, and includes a partition wall 34131, an inclined module 34132, and a sludge thickening vessel 34133.

The partition wall 34131 is installed in an upper portion of the separation tank 3413, and is configured to prevent the cleaning solution introduced into the separation tank 3413 from being mixed with the cleaning solution flowing obliquely upwards between inclined plates of the inclined module 34132. During the settling process, the cleaning solution introduced into the separation tank 3413 flows downwards through the partition wall, and the cleaning solution having flowed downwards flows upwards from the bottom between the inclined plates of the inclined module 34132.

The inclined module 34132 is a part which includes multiple inclined plates installed in the upper portion of the separation tank 3413 to be spaced a predetermined distance apart from each other and enables the contaminated cleaning solution to obliquely flow upwards from the bottom between the inclined plates so as to separate the contaminants from the cleaning solution, and the part applies a fact that settling efficiency is more affected by a settling area than a stay time. The contaminant particles between the inclined plates are transferred to a surface of each of the inclined plates to be settled in accordance with a resultant force of gravity (Fg) and fluid drag (Fl) caused by the flow of the cleaning solution, and the contaminant particles having been transferred to the inclined plates slide downwards.

The sludge thickening vessel 34133 is formed at the bottom of the separation tank 3413 and has a wide upper end portion and a narrow lower end portion so as to have a cross section having a "V"-shaped hopper shape, and the contaminant particles having been settled through the inclined module 34132 are induced to be densely settled by an inclined surface of the sludge thickening vessel 34133 so as to be collected in a thickened sludge state.

The discharge module 3414 is configured to additionally remove the residual contaminants from the cleaning solution whose contaminants have been separated therefrom in the inclined module 34132, includes a first blocking wall 34141 and a second blocking wall 34142, and additionally removes the residual contaminants by enabling the cleaning solution having passed through the separation tank 3413 to flow upwards/downwards inside the discharge module 3414 so as to be discharged.

The first blocking wall 34141 is configured to filter out suspended matter in the residual contaminants of the cleaning solution, and has a shape of a weir which blocks a downward flow of the cleaning solution. The cleaning solution, whose contaminants have been separated therefrom while the contaminated cleaning solution flows upwards from the bottom between the inclined plates, flows upwards in a laminar flow state, and the suspended contaminant matter is filtered out through the first blocking wall 34141 and the cleaning solution overflows the first blocking wall 34141.

The second blocking wall 34142 has a shape of a weir which blocks upward and downward flows of the cleaning solution, and additionally removes the residual contaminants by inducing, to a downward flow, an upward flow of the cleaning solution having overflowed the first blocking wall 34141 and discharging the cleaning solution having passed through the separation tank 3413 while enabling the cleaning solution to flow upwards and downwards inside the discharge module 3414. The cleaning solution whose residual contaminants have been additionally removed through the discharge module 3414 is temporarily stored in the supernatant water storage tank 343 through the outlet port 3415.

The outlet port 3415 guides, to the supernatant water storage tank 343, the cleaning solution whose residual contaminants have been additionally removed through the discharge module 3414.

The inlet pipe 342 has one end connected to the inlet port 3411 of the settling tank 341 and the other end branched to be connected to the circulation buffer tank 32 and the sludge treatment unit 6 (described later), so as to supply the contaminated cleaning solution temporarily stored in the circulation buffer tank and the contaminated cleaning solution collected in the sludge treatment unit 6 to the settling tank 341. To this end, the inlet pipe 342 includes a first inlet branch pipe 3421, a second inlet branch pipe 3422, and a three-way valve 3423.

The first inlet branch pipe 3421 has one end connected to the circulation buffer tank 32 and the other end connected to the three-way valve 3423.

The second inlet branch pipe 3422 has one end connected to the sludge treatment unit 6 and the other end connected to the three-way valve 3423.

The three-way valve 3423 is disposed at a point where the inlet pipe 342 is branched into the first inlet branch pipe 3421 and the second inlet branch pipe 3422, and thus determines a flow channel of the contaminated cleaning solution introduced through the inlet pipe 342. According to adjustment of the three-way valve 3423, the flow channel of the contaminated cleaning solution introduced through the inlet pipe 342 is switched to inflow from the circulation buffer tank 32 and inflow from the sludge treatment unit 6.

The supernatant water storage tank 343 temporarily stores the cleaning solution whose contaminants have been separated therefrom in the settling tank 341, and, in accordance with a water quality measured by a water-quality determination device 36 (described later), the cleaning solution stored in the supernatant water storage tank 343 is transferred to the filtering apparatus 35 to pass through a secondary purification process when the water quality thereof is lower than a set standard, and is resupplied to the scrubber 2 through the cleaning solution resupply unit 4 when the water quality thereof is higher than the set standard.

The sludge buffer tank 345 is a storage tank for temporarily storing the thickened sludge discharged from the sludge thickening vessel 34133 of the settling tank 341 and backwashing water that the settling apparatus 35 discharges during an automatic washing process, and the sludge stored in the sludge buffer tank 345 is supplied to the sludge treatment unit 6.

The supernatant water outlet pipe 346 has one end connected to the supernatant water storage tank 343 and the other end branched to be connected to the filtering apparatus 35 and the cleaning solution resupply unit 4, so as to supply the cleaning solution stored in the supernatant water storage tank to the filtering apparatus 35 or the cleaning solution resupply unit 4. To this end, the supernatant water outlet pipe 346 includes a first supernatant water outlet branch pipe 3461 and a second supernatant water outlet branch pipe 3462.

The first supernatant water outlet branch pipe 3461 has one end connected to the supernatant water outlet pipe 346 and the other end connected to the filtering apparatus 35, so as to supply the cleaning solution temporarily stored in the supernatant water storage tank 343 to the filtering apparatus 35.

The second supernatant water outlet branch pipe 3462 has one end connected to the supernatant water outlet pipe 346 and the other end connected to the cleaning solution resupply unit 4, so as to supply the cleaning solution temporarily stored in the supernatant water storage tank 343 to the cleaning solution resupply unit 4.

The sludge buffer tank connection pipe 347 has one end connected to the bottom of the sludge thickening vessel 34133 of the settling tank 341 and the other end connected to the sludge buffer tank 345, so as to guide the thickened sludge discharged from the sludge thickening vessel 34133 to the sludge buffer tank 345.

The post-filtering chamber connection pipe 348 has one end connected to the supernatant water storage tank 343 and the other end connected to a rear chamber 358 of the filtering apparatus 35, so as to provide a bypass such that the filtering apparatus 35 operates in a bypass mode in which the filtering apparatus directly discharges the introduced cleaning solution with skipping a filtration process.

Figure 7:
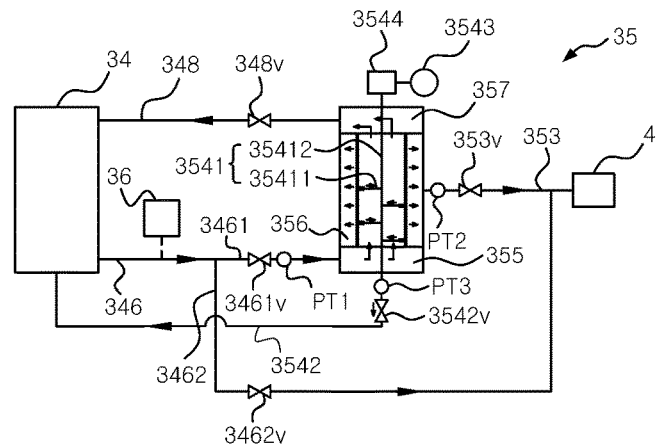
FIG. 7 illustrates a configuration of the filtering apparatus according to FIG. 2.

FIG. 7 illustrates a configuration of the filtering apparatus according to FIG. 2.

Referring to FIGS. 2 to 4 and 7, the filtering apparatus 35 filters, by means of a mesh 352, the cleaning solution introduced through the first supernatant water outlet branch pipe 3461, resupplies the purified cleaning solution to the scrubber 2 through the cleaning solution resupply unit 4 (described later), and includes the mesh 352, a filtered water outlet pipe 353, an automatic washing unit 354, a front chamber 355, a post-filtering chamber 356, and the rear chamber 357.

The mesh 352 has a structure of a net having openings having a predetermined size, and secondarily purifies the contaminated cleaning solution having flowed thereinto by filtering the contaminated cleaning solution to remove the contaminants from the cleaning solution. While the flow rate of a cleaning solution circulating through an existing low-capacity centrifuge is commonly less than 2% of the flow rate circulating through the scrubber 2 and the circulation buffer tank 32, the flow rate of the cleaning solution circulating through the automatically-washable mesh 352 can commonly be up to 30% thereof. In addition, in the present disclosure, since the contaminants having large particles are primarily purified by the settling apparatus 34 (described above), a cycle of increase of back pressure of the mesh 352 is lengthened, so that a cycle of automatic washing is lengthened and overload of the mesh 352 is thus prevented, whereby the long-term operation of the system is possible. In addition, while a centrifuge consumes great energy for operation, the mesh 352 consumes relatively less energy than a centrifuge, so that an operation cost of the system can be reduced.

The filtered water outlet pipe 353 has one end connected to the cleaning solution resupply unit 4 and the cleaning solution discharge pipe 5, so as to resupply the cleaning solution filtered by the mesh 352 to the scrubber 2 through the cleaning solution resupply unit 4 or discharge the filtered cleaning solution out of the system through the cleaning solution discharge pipe 5. To this end, the filtered water outlet pipe 353 may include a valve 353v and a pressure gauge PT2 thereon.

The automatic washing unit 354 is a part for suctioning and removing, by means of backwashing, contaminants adhering to the mesh 352, and includes a suction unit 3541, a discharge unit 3542, a driving unit 3543, and a driven unit 3544.

When the contaminated cleaning solution is filtered by the mesh 352, the contaminants filtered out from the cleaning solution block the openings of the mesh 352 so as to increase the internal pressure of the filtering apparatus 35, so that filtration of the cleaning solution is not performed smoothly. Therefore, since the contaminants blocking the openings of the mesh 352 are required to be removed, in the present disclosure, the contaminants blocking the openings of the mesh 352 are removed by a backwashing method, so that, even during automatic washing of the mesh, the filtering apparatus 35 can filter the contaminated cleaning solution without any obstacle.

The time when backwashing is required may be determined by measurement of a pressure difference between an intermediate-grade water inlet pipe 351 and the filtered water outlet pipe 353, which are an inlet end and an outlet end of the filtering apparatus 35, respectively. As a degree to which the openings of the mesh 352 are blocked by the contaminants increases, an amount of the cleaning solution having been purified and discharged decreases, so that an inlet pressure p1 of the filtering apparatus 35 becomes higher than an outlet pressure p2 thereof. Therefore, when a pressure difference between the pressures is equal to or higher than a set value, backwashing is performed. In addition, when the operation time of the filtering apparatus 35 exceeds a set time, backwashing may be performed.

The suction unit 3541 is a part for suctioning and removing the contaminants adhering to the mesh 352, and includes an extendable rod 35411 and a central rod 35412.

The extendable rod 35411 has a rod shape having a through-hole formed therethrough, and has one end being in close contact with an inner circumferential surface of the mesh 352 and the other end connected to the central rod 35412. The backwashing is performed by, when a valve 3542v of the discharge unit 3542 (described later) is opened, introducing, in the backward direction (internal direction) of the mesh 352, the cleaning solution (filtered water) having been filtered by a differential pressure and the gravity, and thereby, suctioning, together with the backwashing water, the contaminants blocking the openings of the mesh 352 by means of a suction pressure of the extendable rod 35411 being in close contact with the inner circumferential surface of the mesh 352, and the suctioned contaminants and backwashing water are moved to the central rod 35412. In order to perform the backwashing smoothly, a relation among the inlet pressure p1, the outlet pressure p2, and a discharge unit pressure p3 of the filtering apparatus 35 is preferably "p1>p2>p3".

In addition, as a method of increasing the suction pressure of the extendable rod 35411, the valve 353v of the filtered water outlet pipe 353 is temporarily closed under control of the control device 37, and a pressure difference between the inlet pressure p1 and the outlet pressure p2 thus increases, so that the suction pressure of the extendable rod 35411 can be increased and a degree of automatic washing of the mesh 352 can be increased.

Meanwhile, the multiple extendable rods 35411 may be formed to be radially attached to an outer circumferential surface of the central rod 35412 at different heights, and as described below, this form enables more efficient suction of the contaminants adhering to the mesh 352 when the central rod 35412 vertically moves while rotating.

The central rod 35412 has a rod shape having a space formed therein, and has one end connected to the extendable rod 35411 and the other end connected to the discharge unit 3542, so as to discharge the backwashing water and the contaminants having been suctioned by the extendable rod 35411 to the sludge buffer tank 345 through the discharge unit 3542.

The discharge unit 3542 has one end connected to the central rod 35412 of the suction unit 3541 and the other end connected to the sludge buffer tank 345 of the settling apparatus 34, so as to supply the backwashing water to the sludge buffer tank 345. To this end, the discharge unit 3542 may include the valve 3542v and a pressure gauge PT3. The valve 3542v is closed in a filtration mode of the filtering apparatus 35, and is open in a backwashing mode thereof.

The driving unit 3543 has one end connected to the driven unit 3543 to, under control of the control device 37, finally provide power such that the suction unit 3541 vertically moves and rotates, and a motor and the like may be preferably used as the driving unit.

The driven unit 3544 has one end connected to the driving unit 3543 and the other end connected to the central rod 35412 of the suction unit 3541, and is configured to receive the power transferred from the driving unit 3543 and then mechanically move the suction unit 3541 in a vertical direction and rotate the suction unit, and a gear and the like may be preferably used as the driven unit.

The front chamber 355 is a place connected to one end of the mesh 352 to allow the cleaning solution to be temporarily collected, the cleaning solution having been introduced from the first supernatant water outlet branch pipe 3461. When a filtration method using the mesh 352 is used, a constant pressure is required to be formed along a filtration surface formed parallel to a flow of filtrate, and even in a backwashing process of the mesh 352, a pressure difference needs to exist between the front chamber 355 and the post-filtering chamber 356/rear chamber 357 (described later). To this end, a pressure difference is formed between the front chamber 355 and the post-filtering chamber 356/rear chamber 357 (described later), so that the front chamber may induce a flow of the cleaning solution for filtration or backwashing.

The post-filtering chamber 356 is formed to surround an outer surface of the mesh 352 to allow the cleaning solution to be collected therein, the cleaning solution having been purified while passing through an opening unit of the mesh 352, and as described above, the post-filtering chamber forms a flow of the cleaning solution for filtration and a pressure difference for effective backwashing. The filtered cleaning solution flows out through the filtered water outlet pipe 353 to be supplied to the cleaning solution resupply unit 4 or discharged out of a ship through the cleaning solution discharge pipe 5. As described above, the filtered water outlet pipe 353 may include the valve 353v and the pressure gauge PT2 thereon.

The rear chamber 357 is formed at the other end of the mesh 352 so as to allow the cleaning solution, which does not pass through the opening unit of the mesh 352, to be collected therein. In the filtration method of the present disclosure, the filtrate flows along the filtration surface while being parallel to the filtration surface, so that a significant portion of the cleaning solution introduced into the front chamber 355 is collected in the rear chamber 357 without passing through the opening unit of the mesh 352. The collected cleaning solution is returned to the supernatant water storage tank 343 through the post-filtering chamber connection pipe 348.

The rear chamber 357 is disposed in the filtering apparatus 35 of the present disclosure, so that, in a case where proper filtration does not occur due to inspection of the filtering apparatus 35 or accumulation of the contaminants on a surface of the mesh 352, a case where the filtering apparatus 35 malfunctions, and the like, the filtering apparatus 35 can operate in the bypass mode in which the filtering apparatus discharges the cleaning solution having been introduced thereinto as it is through the bypass with skipping the filtration process. Specifically, a flow of the cleaning solution returning to the supernatant water storage tank 343 through the post-filtering chamber connection pipe 348 and the rear chamber 357 formed at the other end of the mesh 352 is formed, so that the system can be continuously operated without having to stop the entire system, and the provided bypass of the cleaning solution may also play a role of controlling the flow rate and a flow of the cleaning solution in the system even when the filtration process is not performed. The lack of a supply of the cleaning solution and the sedimentation (clogging, scaling, and fouling) of the contaminants in the purification system, which may occur due to stop of the flow of the cleaning solution, can be prevented.

The water-quality determination device 36 is disposed in the supernatant water outlet pipe 346 to determine the water quality of the cleaning solution flowing out from the supernatant water storage tank 343. According to the water-quality level determined by the water-quality determination device 36, when the water quality level is lower than a set standard, the cleaning solution flowing out from the supernatant water storage tank 343 is supplied to the filtering apparatus 35 through the first supernatant water outlet branch pipe 3461 so as to be secondarily purified and is then supplied to the cleaning solution resupply unit 4, and, when the water quality level satisfies the set standard, the cleaning solution is supplied to the cleaning solution resupply unit 4 as it is through the second supernatant water outlet branch pipe 3462, so that the system can be efficiently operated.

The control device 37 is configured to entirely control the cleaning solution purification unit 3 and, specifically, in regard to the settling apparatus 34, may determine, by controlling the three-way valve 3423, one of the cleaning solution stored in the circulation buffer tank 32 and the cleaning solution collected in the sludge treatment unit 6 as the cleaning solution to be introduced into the settling apparatus 34, and, in accordance with a value with respect to the cleaning solution having been primarily purified, which is determined by the water-quality determination device 36, determine whether the cleaning solution stored in the supernatant water storage tank 343 of the settling apparatus 34 is to be supplied to the filtering apparatus 35 or the cleaning solution resupply unit 4. In addition, in regard to the filtering apparatus 35, the control device receives information on the inlet pressure p1 and the outlet pressure p2 of the mesh from pressure gauges PT1, PT2, and PT3 of the inlet end, the outlet end, and a discharge end of the filtering apparatus, and controls a valve 351v of the intermediate-grade water inlet pipe 351, the valve 353v of the filtered water outlet pipe 353, and the valve 3542v of the discharge unit 3542, so as to, as described above, enable a pressure relation among the ends of the filtering apparatus to be "p1>p2>p3", and thus enable the backwashing to be smoothly performed.

FIG. 2 illustrates a configuration of the flue gas cleaning solution purification system according to one embodiment of the present disclosure, and FIG. 3 is a block diagram of the flue gas cleaning solution purification system according to FIG. 2. Referring to FIGS. 2 to 3, the cleaning solution resupply unit 4 has one end connected to the filtered water outlet pipe 353 and the other end connected to the scrubber 2, so as to resupply the cleaning solution having been primarily and secondarily purified by the cleaning solution purification unit 3 to the scrubber 2 and thus enable the cleaning solution to circulate according to an order of "the scrubber 2→the cleaning solution purification unit 3→the cleaning solution resupply unit 4→the scrubber 2". To this end, the cleaning solution resupply unit 4 may include a pump 4p thereon.

Figure 8:
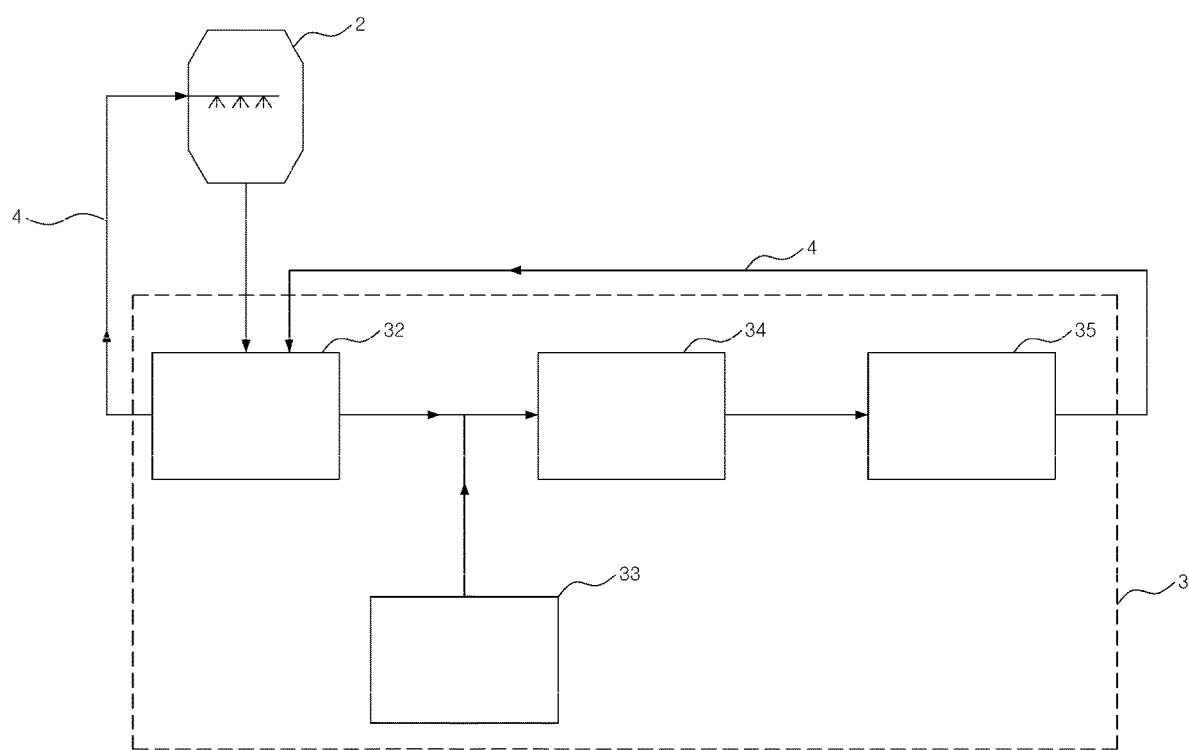
FIG. 8 illustrates a configuration of the cleaning solution resupply unit according to FIG. 2.
Figure 9:
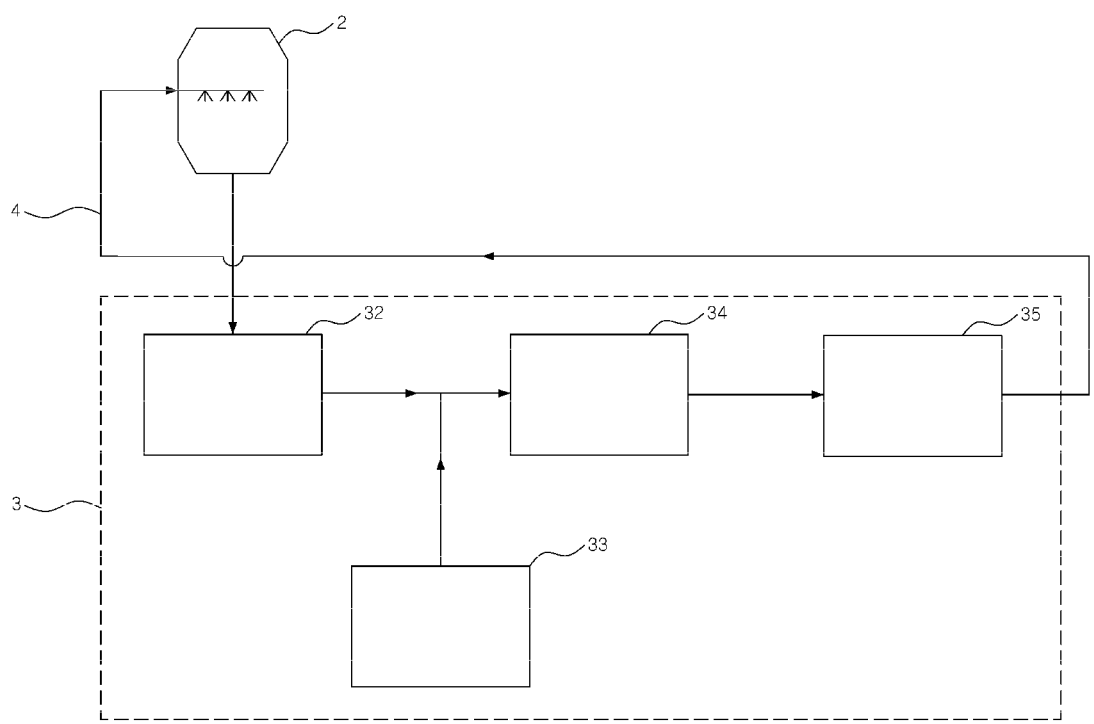
FIG. 9 illustrates a configuration of the cleaning solution resupply unit according to another embodiment of the present disclosure.
Figure 10:
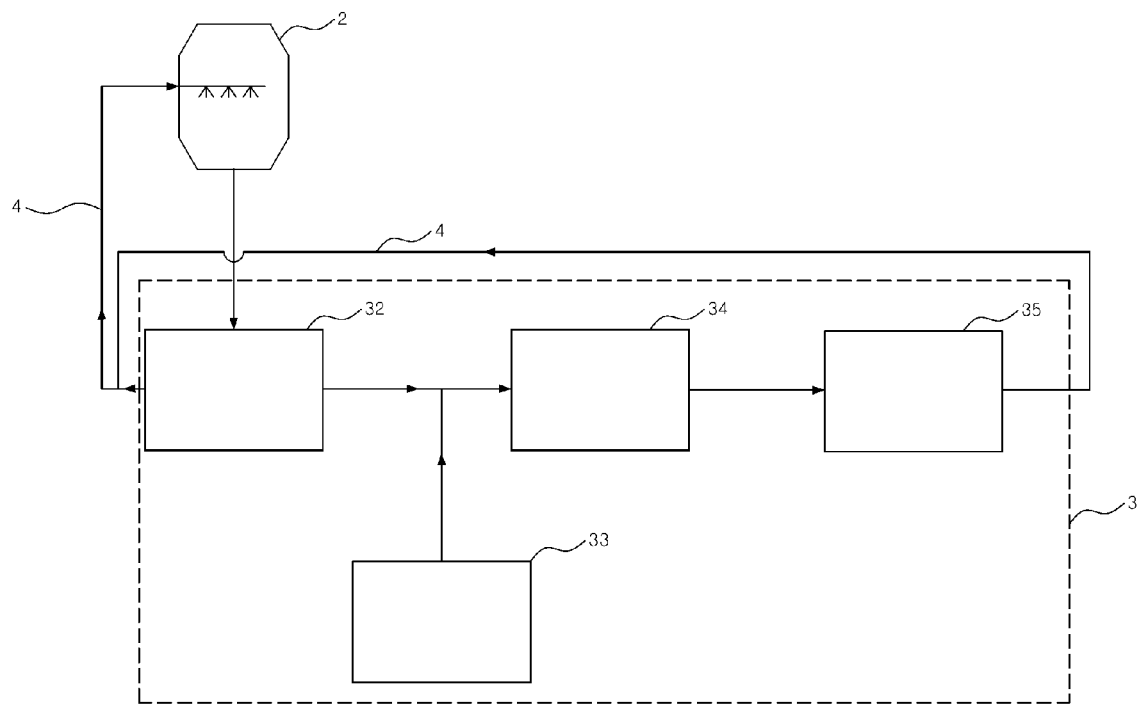
FIG. 10 illustrates a configuration of the cleaning solution resupply unit according to another embodiment of the present disclosure.

FIG. 8 illustrates a configuration of the cleaning solution resupply unit according to FIG. 2, FIG. 9 illustrates a configuration of the cleaning solution resupply unit according to another embodiment of the present disclosure, and FIG. 10 illustrates a configuration of the cleaning solution resupply unit according to another embodiment of the present disclosure.

Referring to FIG. 8, the cleaning solution resupply unit 4 supplies the cleaning solution having been purified by the cleaning solution purification unit 3 to the scrubber 2 through the circulation buffer tank 32. When the cleaning solution is supplied through the circulation buffer tank 32, an amount of the cleaning solution to be treated (purified) by the cleaning solution purification unit 3 can be reduced. By the method described above, the contamination level of the cleaning solution supplied to the scrubber 2 may be relatively high in comparison with a method described below, but since the cleaning solution discharged from the scrubber 2 is purified to be maintained below a predetermined concentration, rather than entirely purified, a load of the cleaning solution purification unit 3 can be reduced.

Referring to FIG. 9, the cleaning solution resupply unit 4 directly supplies the cleaning solution having been purified by the cleaning solution purification unit 3 to the scrubber 2. This case has an advantage that the contamination level of the cleaning solution supplied to the scrubber 2 is the lowest in comparison with another embodiment. However, in this case, there is a disadvantage that the cleaning solution purification unit 3 is required to purify the entire amount of the cleaning solution discharged from the scrubber 2.

Referring to FIG. 10, the cleaning solution resupply unit 4 is configured to extend as a single pipe branching off into a pipe for resupplying a part of the cleaning solution stored in the circulation buffer tank 32 to the scrubber 2, and another pipe for resupplying the cleaning solution purified by the cleaning solution purification unit 3 to the scrubber 2. In this case, it may be seen as an intermediate form obtained by mediation of the described advantages and disadvantages of FIGS. 7 and 8. That is, it may be considered that, by this method, a cleaning solution at a relatively intermediate level of contamination is supplied to the scrubber (2), and an intermediate amount thereof is to be purified by the cleaning solution purification unit 3.

FIG. 2 illustrates a configuration of the flue gas cleaning solution purification system according to one embodiment of the present disclosure, and FIG. 3 is a block diagram of the flue gas cleaning solution purification system according to FIG. 2. Referring to FIGS. 2 to 3, the cleaning solution discharge pipe 5 is connected to the filtered water outlet pipe 353 at one end thereof, so as to enable the filtered cleaning solution to be transported to the outside of a ship to be discharged to the sea. Adjustment of the three-way valve 72 determines whether the filtered cleaning solution flowing out from the filtered water outlet pipe 353 is to be transported to the cleaning solution resupply unit 4 or to the cleaning solution discharge pipe 5.

Figure 11:
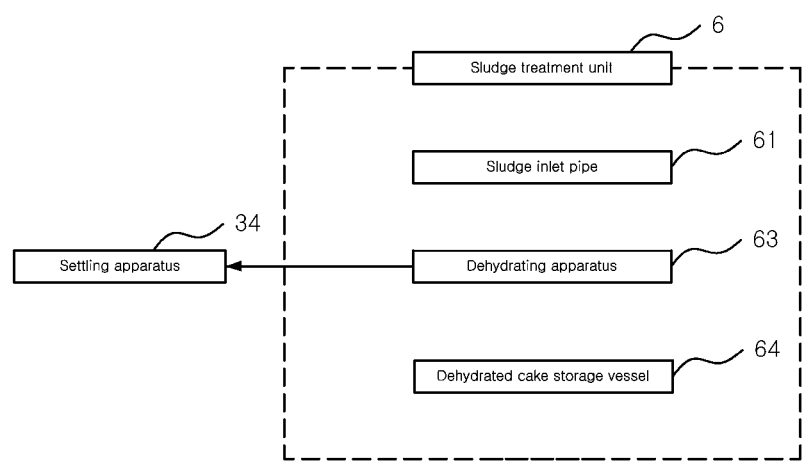
FIG. 11 is a block diagram of the sludge treatment unit according to FIG. 2.

FIG. 2 illustrates a configuration of the flue gas cleaning solution purification system according to one embodiment of the present disclosure, FIG. 3 is a block diagram of the flue gas cleaning solution purification system according to FIG. 2, and FIG. 11 is a block diagram of the sludge treatment unit according to FIG. 2. Referring to FIGS. 2 to 3 and 11, the sludge treatment unit 6 treats and stores the sludge discharged from the cleaning solution purification unit, and includes a cleaning solution purification unit connection pipe 61, a dehydrating apparatus 63, and a dehydrated cake storage vessel 64.

The cleaning solution purification unit connection pipe 61 has one end connected to the sludge buffer tank 345 of the settling apparatus 34 and the other end connected to the dehydrating apparatus 63, so as to supply the sludge discharged from the sludge buffer tank 345 to the dehydrating apparatus 63.

The dehydrating apparatus 63 collects the cleaning solution contained in the sludge supplied from the sludge buffer tank 62, and the collected cleaning solution is supplied to the settling apparatus 34 through the second inlet branch pipe 3422. Since the sludge discharged from the settling apparatus 34 and the filtering apparatus 35 contains a significant amount of the cleaning solution (moisture), it is more efficient to remove the cleaning solution from the sludge through the dehydrating apparatus 63 and to reuse the same than to discharge the sludge out of the system as it is, because a smaller amount of sludge is discharged, and a larger amount of cleaning solution is reused.

According to one embodiment, the dehydrating apparatus 63 may include a cylindrical filtering body and a screw rotatably inserted into the filtering body, and may be configured in a screw press method in which the cleaning solution of the sludge is collected by the filtering body while the sludge introduced from one end side of the screw is supplied to a space between the filtering body and the screw and is then transported to the other end side of the screw by means of rotation of the screw.

In addition, according to another embodiment, the dehydrating apparatus 63 may include a plurality of filtration plates which are horizontally movable and installed to be spaced a predetermined distance apart from each other and a pressurizing means for horizontally pressurizing the filtration plates, and may be configured in a filter press method in which the cleaning solution is collected from the sludge supplied to a space between the filtration plates by means of pressurization of the filtration plates.

The flue gas cleaning solution purification system according to the present disclosure includes: a scrubber 2 for removing contaminants such as sulfur oxides from flue gas by using a cleaning solution; a cleaning solution purification unit 3 for purifying the contaminated cleaning solution discharged from the scrubber 2; a cleaning solution resupply unit 4 for resupplying, to the scrubber 2, the cleaning solution having been purified by the cleaning solution purification unit; and a sludge treatment unit 6 for treating and storing sludge discharged from the cleaning solution purification unit, wherein the cleaning solution purification unit 3 includes: a circulation buffer tank 32 for temporarily storing the contaminated cleaning solution discharged from the scrubber so as to improve stability of a cleaning solution circulation system; a coagulant supply apparatus 33 for supplying a coagulant for coagulating the contaminants of the contaminated cleaning solution discharged from the scrubber 2 so as to enable easy coagulation of the contaminants in the cleaning solution and thus enable more efficient purification; a settling apparatus 34 for primarily purifying the cleaning solution by enabling settling of the contaminants thereof, so as to reduce a load of a filtering apparatus 35, namely a main purifying apparatus; and the filtering apparatus 35 for secondarily purifying the cleaning solution, the filtering apparatus 34 including an automatic washing unit 354 so as to operate for a long time.

Hereinafter, a flue gas cleaning solution purification method using the flue gas cleaning solution purification system described above will be described in detail.

Figure 12:
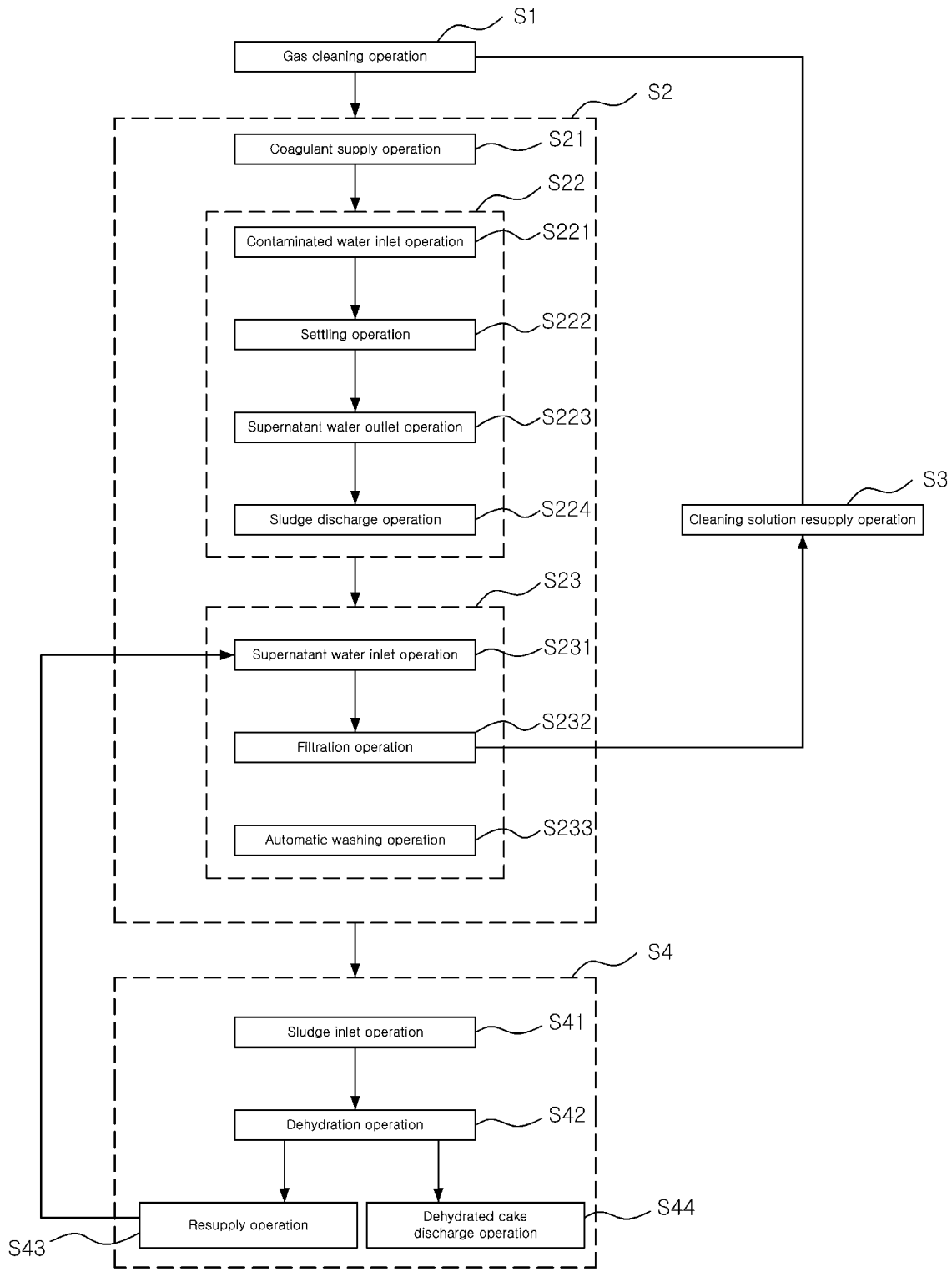
FIG. 12 is a flowchart illustrating a flue gas cleaning solution purification method according to one embodiment of the present disclosure.

FIG. 12 is a flowchart illustrating a flue gas cleaning solution purification method according to one embodiment of the present disclosure. Referring to FIG. 12, a flue gas cleaning solution purification method of the present disclosure includes: gas cleaning operation S1 of removing, by a scrubber 2, contaminants such as sulfur oxides from flue gas by means of adsorption between the contaminants and a cleaning solution; cleaning solution purification operation S2 of purifying, by a cleaning solution purification unit 3, the contaminated cleaning solution supplied from the scrubber 2; cleaning solution resupply operation S3 of resupplying, by a cleaning solution resupply unit 4, the purified cleaning solution to the scrubber 2; and sludge treatment operation S4 of treating and storing, by a sludge treatment unit 6, sludge discharged from the cleaning solution purification unit 3.

Gas cleaning operation S1 refers to an operation in which the scrubber 2 removes contaminants such as sulfur oxides contained in flue gas introduced from a flue gas supply unit 1 by means of adsorption using a cleaning solution supplied to the scrubber 2. The cleaning solution may be included at the beginning of a process of cleaning flue gas or added during system operation.

Cleaning solution purification operation S2 refers to an operation in which the cleaning solution purification unit 3 purifies the contaminated cleaning solution discharged from the scrubber 2, and includes coagulant supply operation S21, first purification operation S22, and second purification operation S23.

Coagulant supply operation S21 refers to an operation in which a coagulant supply apparatus 32 supplies a coagulant to the contaminated cleaning solution flowing out from a circulation buffer tank 32. By supplying the coagulant, the contaminants contained in the cleaning solution are coagulated, so that the size of a cluster of the contaminants is increased, whereby first purification operation S22 in a settling apparatus 34 and second purification operation S23 in a filtering apparatus 35 are efficiently performed.

First purification operation S22 refers to an operation in which the settling apparatus 34 primarily purifies the contaminated cleaning solution discharged from the scrubber 2 by storing the contaminated cleaning solution and enabling settling of the contaminants thereof, and includes contaminated water inlet operation S221, settling operation S222, supernatant water outlet operation S223, and sludge discharge operation S224.

Contaminated water inlet operation S221 refers to an operation in which the contaminated cleaning solution temporarily stored in the circulation buffer tank 32 and the coagulant supplied from the coagulant supply apparatus 33 are introduced into the settling apparatus 34. The circulation buffer tank 32 has an effect of improving stability of a system of circulating the cleaning solution.

Settling operation S222 refers to an operation in which a settling tank 341 enables the contaminated cleaning solution to stay therein for a predetermined time and thus enables settling of the contaminants contained in the contaminated cleaning solution. The settling tank 341 is a part which includes a inclined plate module including multiple inclined plates installed to be spaced a predetermined distance apart from each other, and in which the contaminated cleaning solution obliquely flows upwards from the bottom between the inclined plates, so that the contaminants are separated from the cleaning solution, and the part applies a fact that settling efficiency is more affected by a settling area than a stay time.

Supernatant water outlet operation S223 refers to an operation in which a supernatant water outlet pipe 346 discharges the primarily purified cleaning solution in order to finally supply, to the filtering apparatus 35, the cleaning solution having been purified through a settling process of the contaminants in the settling tank 341.

Sludge discharge operation S224 is a process of supplying, to the sludge treatment unit 6, sludge which is a contaminant settled through a sludge inlet pipe 61 connected to the bottom of a sludge buffer tank 345. The sludge passes through a dehydration process in the sludge treatment unit 6, the dehydrated sludge is stored in a dehydrated cake storage vessel 64 (described later), and the cleaning solution collected during the dehydration process is introduced into the settling apparatus 34 to pass through first purification operation S22 again.

Second purification operation S23 refers to an operation in which the filtering apparatus 35 filters, by means of a mesh 352, the cleaning solution introduced through a first supernatant water outlet branch pipe 3461, and includes supernatant water inlet operation S231, filtration operation S232, and automatic washing operation S233.

Supernatant water inlet operation S231 refers to an operation in which the supernatant water having passed through first purification operation by the settling apparatus 34 is introduced into the filtering apparatus through the first supernatant water outlet branch pipe 3461.

Filtration operation S232 refers to an operation in which the mesh 352 secondarily purifies the introduced cleaning solution by filtering the cleaning solution to remove the contaminants from the cleaning solution. The filtered water having passed through filtration operation S232 is resupplied to the scrubber 2 through the cleaning solution resupply unit 4.

Automatic washing operation S233 refers to an operation in which an automatic washing unit 354 suctions and removes the contaminants adhering to the mesh 352 by means of backwashing, and includes sensing operation S2331, suction operation S2332, and discharge operation S2333.

Sensing operation S2331 is a process of measuring pressures of an intermediate-grade water inlet pipe 351 and a filtered water outlet pipe 353 which are an inlet end and an outlet end of the filtering apparatus 35, respectively, and then sensing whether a pressure difference between the pressures is measured to be equal to or higher than a set value. As a degree to which openings of the mesh 352 are blocked by the contaminants increases, an amount of the cleaning solution having been purified and discharged decreases, so that an inlet pressure p1 of the filtering apparatus 35 becomes higher than an outlet pressure p2 thereof, and thus backwashing is performed when a pressure difference between the pressures is equal to or higher than a set value.

Suction operation S2332 refers to an operation in which a suction unit 3541 suctions and removes the contaminants adhering to the mesh 352. The backwashing is performed by, when a valve 3542v of a discharge unit 3542 is opened, introducing, in the backward direction (internal direction) of the mesh 352, the cleaning solution (filtered water) having been filtered by a differential pressure and the gravity, thereby, suctioning the contaminants blocking the openings of the mesh 352 by means of a suction pressure of the suction unit 3541 adjacent to an inner circumferential surface of the mesh 352, and discharging the suctioned contaminants and backwashing water to the sludge buffer tank 345 through the discharge unit 3542.

Discharge operation S2333 refers to an operation in which the discharge unit 3542, which has one end connected to the suction unit 3541 and the other end connected to a cleaning solution purification unit connection pipe 61 and a sludge discharge pipe 344 of the settling apparatus 34, discharges the backwashing water. The discharged backwashing water is supplied to the sludge buffer tank 345 and passes through sludge treatment operation S4 (described later).

Cleaning solution resupply operation S3 refers to an operation in which the cleaning solution resupply unit 4, which has one end connected to the filtered water outlet pipe 353 and the other end connected to the scrubber 2, resupplies the cleaning solution having been purified through cleaning solution purification operation S2 to the scrubber 2 and thus enables the cleaning solution to circulate according to an order of "the scrubber 2→the cleaning solution purification unit 3→the cleaning solution resupply unit 4→the scrubber 2". Cleaning solution resupply operation S3 is performed according to a method of resupplying, by the cleaning solution resupply unit 4, the cleaning solution to the scrubber 2 through the circulation buffer tank 32, a method of directly resupplying the cleaning solution to the scrubber 2, and a cleaning solution resupply method obtained by a compromise between the two methods above.

Sludge treatment operation S4 refers to an operation in which the sludge treatment unit 6 treats and stores the sludge discharged from the sludge buffer tank 345, and includes sludge inlet operation S41, dehydration operation S42, resupply operation S43, and a dehydrated cake discharge operation S44.

Sludge inlet operation S41 refers to an operation in which the cleaning solution purification unit connection pipe 61, which has one end connected to the bottom of the sludge buffer tank 345 of the settling apparatus 34 and the other end connected to a dehydrating apparatus 63, supplies the sludge discharged from the sludge buffer tank 345 to the dehydrating apparatus 63.

Dehydration operation S42 refers to an operation in which the dehydrating apparatus 63 collects the cleaning solution contained in the sludge having been supplied from the sludge buffer tank 345, supplies the collected cleaning solution to the settling apparatus 34, and supplies the dehydrated sludge to the dehydrated cake storage vessel 64. Since the sludge discharged from the settling apparatus 34 and the filtering apparatus 35 contains a significant amount of the cleaning solution (moisture), it is more efficient to remove the cleaning solution from the sludge and to reuse the same, because a smaller amount of sludge is discharged, and a larger amount of cleaning solution is reused.

Resupply operation S43 refers to an operation in which a second inlet branch pipe 3462 discharges the cleaning solution having been collected by the dehydrating apparatus 63 and then supplies the cleaning solution to the settling apparatus 34. The cleaning solution having been supplied to the settling apparatus 34 is resupplied to the scrubber 2 through first purification operation S22, second purification operation S23, and cleaning solution resupply operation S3.

Dehydrated cake discharge operation S44 refers to an operation in which a dehydrated cake discharge pipe 633 discharges the dehydrated sludge to the dehydrated cake storage vessel 64.

The detailed description above presents examples of the present disclosure. In addition, preferred embodiments of the present disclosure have been presented and described above, and the present disclosure may be used in various other combinations, modifications, and environments. That is, modifications can be made within the scope of the concept of the present disclosure, which is disclosed in the specification, the scope equivalent to the disclosed description, and/or the scope of the skill or the knowledge of the corresponding field. The embodiments described above explain the best state for implementing the technical idea of the present disclosure, and various modifications required in the specific application field and use of the present disclosure are also possible. Therefore, the detailed description of the present disclosure is not intended to limit the present disclosure to the disclosed embodiments. In addition, the following claims should be interpreted as including other embodiments as well.

The invention claimed is:

1. A flue gas cleaning solution purification system comprising:
   a scrubber configured to remove contaminants from flue gas by using a cleaning solution so as to form a contaminated cleaning solution;
   a cleaning solution purification system comprising a settling tank fluid coupled to the scrubber so as to receive the contaminated cleaning solution therefrom during use, the settling tank configured to separate the contaminated cleaning solution during use into a supernatant water and a sludge obtained by settling of the contaminants contained in the contaminated cleaning solution;

a cleaning solution resupply line extending from the cleaning solution purification system back to the scrubber;

a supernatant water storage tank fluid coupled to the settling tank for receiving the supernatant during use;

a filter configured to filter the supernatant water during use; and a supernatant water outlet pipe having first end fluid coupled to the supernatant water storage tank and an opposing second end that branches into a first supernatant water outlet branch pipe fluid coupled to the filter and a second supernatant water outlet branch pipe fluid coupled to the cleaning solution purification system or to the cleaning solution resupply line.

2. The flue gas cleaning solution purification system of claim 1, wherein the settling tank includes an inclined module including multiple inclined plates installed to be spaced a predetermined distance apart from each other, so as to separate the contaminants from the contaminated cleaning solution while the contaminated cleaning solution obliquely flows upwards from a bottom of the settling tank between the inclined plates.

3. The flue gas cleaning solution purification system of claim 2, wherein a bottom end of the settling tank includes a sludge thickening vessel portion formed to have a wide upper end portion and a narrow lower end portion.

4. The flue gas cleaning solution purification system of claim 3, further comprising:

a sludge buffer tank fluid coupled to the sludge thickening vessel portion of the settling tank for receiving the sludge during use.

5. The flue gas cleaning solution purification system of claim 4, further comprising a sludge dehydrator fluid coupled with the sludge buffer tank for receiving the sludge therefrom, the sludge dehydrator being configured to separate the sludge into the cleaning solution and a dehydrated sludge cake, the sludge dehydrator comprising a dehydrated sludge cake storage vessel for receiving the dehydrated sludge cake and a return pipe for delivering the cleaning solution removed from the sludge back to the settling tank.

6. The flue gas cleaning solution purification system of claim 5, wherein the return pipe is fluid coupled with the inlet pipe.

7. The flue gas cleaning solution purification system of claim 6, wherein a three-way valve is disposed at a point where the return line fluid couples with the inlet pipe.

8. The flue gas cleaning solution purification system of claim 7, wherein the sludge dehydrator comprises a cylindrical filtering body and a screw rotatably inserted into the filtering body, and the cleaning solution is collected by the filtering body while the sludge introduced from one end side of the screw is supplied to a space between the filtering body and the screw and is then transported to the other end side of the screw by means of rotation of the screw.

9. The flue gas cleaning solution purification system of claim 7, wherein the sludge dehydrator comprises a plurality of filtration plates which are horizontally movable and installed to be spaced a predetermined distance apart from each other and a press configured to horizontally pressurize the filtration plates, and the cleaning solution is collected from the sludge supplied to a space between the filtration plates by pressurization of the filtration plates.

10. The flue gas cleaning solution purification system of claim 1, further comprising a water-quality monitoring configured to monitor a water quality of the supernatant water flowing out through the supernatant water outlet pipe.

11. The flue gas cleaning solution purification system of claim 10, further comprising a controller configured to, based on a result of the water-quality monitor, supply the supernatant water stored in the supernatant water storage tank to the filter through the first supernatant water outlet branch pipe in case that a water quality of the supernatant water is lower than a set standard, and supply the stored supernatant water to the cleaning solution purification system or to the cleaning solution resupply line through the second supernatant water outlet branch pipe in case that the water quality of the supernatant water is higher than the set standard.

12. The flue gas cleaning solution purification system of claim 1, wherein the filter comprises a mesh configured to filter the supernatant water and an automatic washer configured to remove contaminants adhering to the mesh.

13. The flue gas cleaning solution purification system of claim 12, wherein the automatic washer comprises a suction portion configured to suction backwashing water containing the contaminants adhering to the mesh, a discharge portion containing one side of the suction portion so as to discharge the backwashing water having been suctioned by the suction portion, a driving portion configured to provide power, and a driven portion configured to receive the power transferred from the driving portion so as to mechanically rotate the suction portion.

14. The flue gas cleaning solution purification system of claim 12, wherein the filter is configured to operate in a filtration mode of filtering the supernatant water through the mesh, and a bypass mode of discharging the supernatant water through a bypass route without a filtration process.

15. The flue gas cleaning solution purification system of claim 1, wherein the cleaning solution purification system includes a circulation buffer tank configured to temporarily store the contaminated cleaning solution discharged from the scrubber before passing the contaminated cleaning solution to the settling tank.

\* \* \* \* \*